US009107229B2

(12) United States Patent  
Choudhury et al.

(10) Patent No.: US 9,107,229 B2  
(45) Date of Patent: Aug. 11, 2015

(54) METHOD, APPARATUS, AND COMPUTER PROGRAM PRODUCT FOR SIGNALING FOR SECTORIZED BEAM OPERATION IN WIRELESS NETWORKS

(71) Applicant: Nokia Corporation, Espoo (FI)

(72) Inventors: Sayantan Choudhury, Berkeley, CA (US); Chittabrata Ghosh, Freemont, CA (US); Esa Tuomaala, Emeryville, CA (US); Klaus Franz Doppler, Albany, CA (US); Amitav Mukherjee, Richmond, CA (US)

(73) Assignee: Nokia Technologies Oy, Espoo (FI)

( * ) Notice: Subject to any disclaimer, the term of this patent is extended or adjusted under 35 U.S.C. 154(b) by 153 days.

(21) Appl. No.: 13/691,925

(22) Filed: Dec. 3, 2012

(65) Prior Publication Data

US 2014/0153415 A1     Jun. 5, 2014

(51) Int. Cl.
| | |
|---|---|
| *G06F 11/00* | (2006.01) |
| *H04W 72/08* | (2009.01) |
| *H04W 72/04* | (2009.01) |
| *H04L 1/00* | (2006.01) |
| *H04W 24/00* | (2009.01) |
| *H04W 48/00* | (2009.01) |

(Continued)

(52) U.S. Cl.  
CPC .............. *H04W 72/087* (2013.01); *H04B 7/024* (2013.01); *H04L 1/00* (2013.01); *H04W 24/00* (2013.01); *H04W 48/00* (2013.01); *H04W 72/0446* (2013.01); *H04W 72/042* (2013.01); *H04W 72/085* (2013.01); *H04W 74/00* (2013.01)

(58) Field of Classification Search  
CPC .................................................... H04W 72/087  
USPC ......................................................... 370/352  
See application file for complete search history.

(56) References Cited

U.S. PATENT DOCUMENTS

| 2004/0203474 | A1 | 10/2004 | Miller et al. |
| 2007/0270155 | A1 | 11/2007 | Nelson et al. |

(Continued)

FOREIGN PATENT DOCUMENTS

| EP | 2317669 | 5/2011 |

OTHER PUBLICATIONS

Extended European Search Report for Application No. 13187215.2-1857 / 2739106, dated Nov. 28, 2014.

(Continued)

*Primary Examiner* — Shripal Khajuria  
(74) *Attorney, Agent, or Firm* — Locke Lord LLP

(57) ABSTRACT

Method, apparatus, and computer program product embodiments configure channel access windows in overlapping network environments. An example method embodiment comprises: transmitting, by an access node, a measurement request to an associated wireless device, to perform measurements of signals received from other access nodes to which the device is not associated, the device being a member of a group of devices based on transmission by the access node to the device, of a directional beacon frame; receiving from the device, a measurement response comprising information on a directional message with an access node identifier of another access node to which the device is not associated; and determining a time window that may be used by devices that are members of the group, for transferring data between members of the group and the access node, based at least partly on the measurement response.

20 Claims, 15 Drawing Sheets

(51) Int. Cl.
*H04B 7/02* (2006.01)
*H04W 74/00* (2009.01)

(56) References Cited

U.S. PATENT DOCUMENTS

2008/0002632 A1  1/2008  Pandey et al.
2013/0077554 A1  3/2013  Gauvreau et al.

OTHER PUBLICATIONS

M. Park: IEEE P802.11; Wireless LANs; 11-11-1137-05-00ah-specification-framework-for-tgah; Jan. 2012.
M. Park: IEEE P802.11; Wireless LANs; 11-11-1137-09-00ah-specification-framework-for-tgah; May 2012.
M. Park: IEEE P802.11; Wireless LANs; 11-11-1137-10-00ah-specification-framework-for-tgah; Jul. 2012.
Zhong Yi Jin, et al.,: IEEE P802.11; Wireless LANs; 11-11-1512-04-00ah-mac-considerations-for-802-11ah; Nov. 2011.

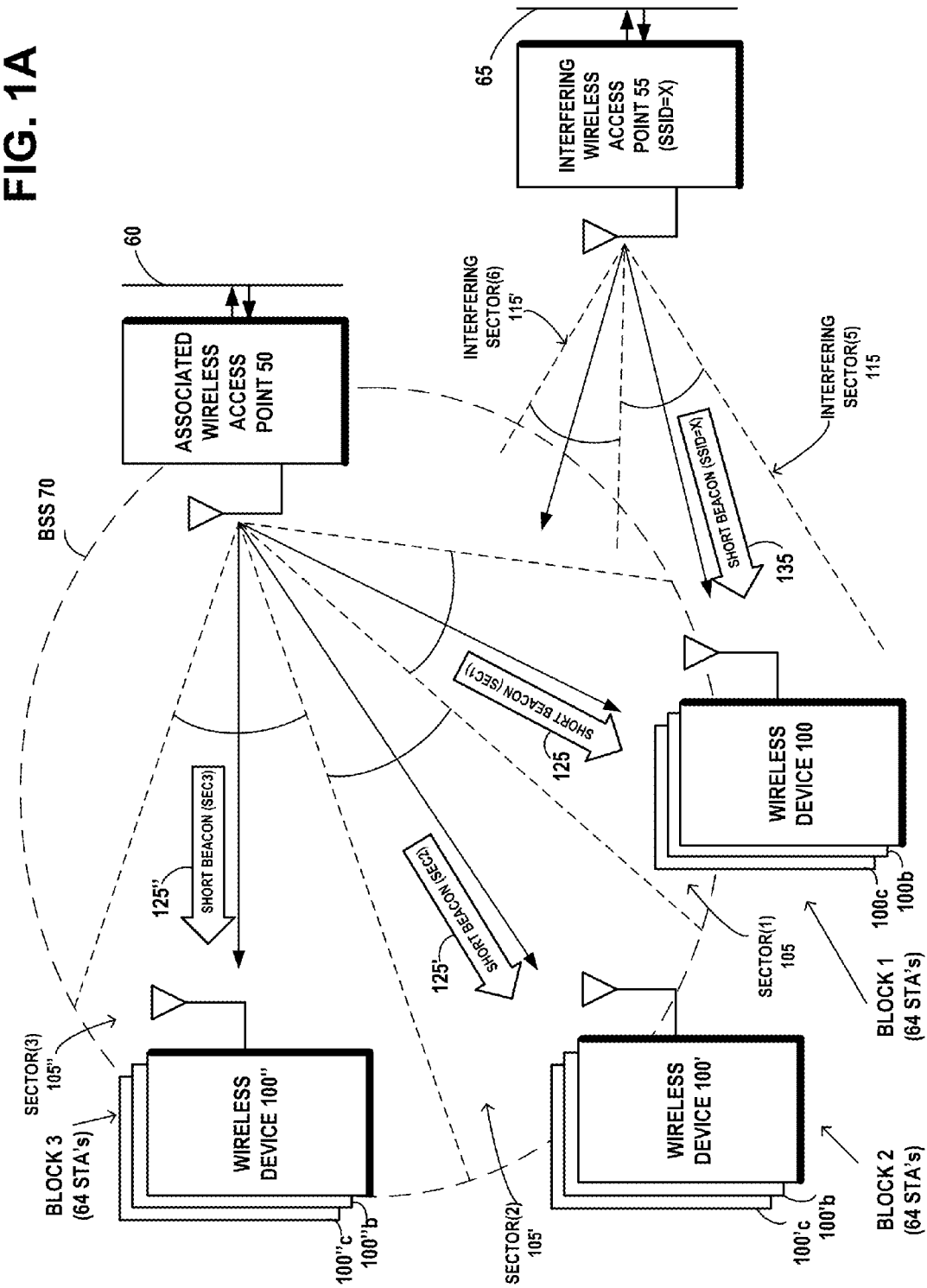

FIG. 3C

STEP 352: RECEIVING, BY AN ACCESS NODE, IN A DIRECTIONAL TRANSMISSION SECTOR OF THE ACCESS NODE, AT LEAST ONE INTERFERING SIGNAL FROM AT LEAST ONE NEIGHBORING ACCESS NODE OR FROM AT LEAST ONE NEIGHBORING WIRELESS DEVICE ASSOCIATED WITH THE AT LEAST ONE NEIGHBORING ACCESS NODE;

STEP 354: DETERMINING, BY THE ACCESS NODE, A DIFFERENT DIRECTIONAL TRANSMISSION SECTOR OF THE ACCESS NODE, WHERE TRANSMISSIONS BY THE ACCESS NODE IN THE DIFFERENT DIRECTIONAL TRANSMISSION SECTOR WILL CAUSE MINIMAL INTERFERENCE TO THE AT LEAST ONE NEIGHBORING ACCESS NODE OR THE AT LEAST ONE NEIGHBORING WIRELESS DEVICE ASSOCIATED WITH THE AT LEAST ONE NEIGHBORING ACCESS NODE; AND

STEP 356: TRANSMITTING, BY THE ACCESS NODE, IN THE DIFFERENT DIRECTIONAL TRANSMISSION SECTOR OF THE ACCESS NODE, TO A GROUP OF WIRELESS DEVICES ASSOCIATED WITH THE ACCESS NODE AND OCCUPYING THE DIFFERENT DIRECTIONAL TRANSMISSION SECTOR, AN INDICATION OF A TIME WINDOW THAT MAY BE USED BY THE WIRELESS DEVICES THAT ARE MEMBERS OF THE GROUP OF WIRELESS DEVICES, FOR TRANSFERRING DATA BETWEEN MEMBERS OF THE GROUP OF WIRELESS DEVICES AND THE ACCESS NODE, BASED AT LEAST PARTLY ON THE DETERMINATION BY THE ACCESS NODE.

350

PROBABILITY THAT BOTH APS SUCCESSFULLY DECODE THEIR DESIRED PACKETS.

GLOBAL CSI ACQUISITION PROCESS AT STAS WHEN THEY COMPUTE CBF SOLUTION

METHOD, APPARATUS, AND COMPUTER PROGRAM PRODUCT FOR SIGNALING FOR SECTORIZED BEAM OPERATION IN WIRELESS NETWORKS

FIELD

The field of technology relates to wireless communication and more particularly to configuring channel access windows in overlapping network environments.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

SUMMARY

Method, apparatus, and computer program product embodiments are disclosed for configuring channel access windows in overlapping network environments.

An example embodiment of the invention includes a method comprising:

receiving by a wireless device, a measurement request from an associated access node, to perform measurement of at least one signal received from at least one other access node to which the wireless device is not associated, the wireless device being a member of a group of wireless devices based on reception by the wireless device of a directional beacon frame from the associated access node;

receiving, by the wireless device during measurement, a directional message with an access node identifier of another access node to which the wireless device is not associated and determining a reception power of the directional message;

transmitting, by the wireless device, to the associated access node, a measurement response comprising information on the directional message; and receiving, by the wireless device, from the associated access node, an indication of a time window that may be used by the wireless device for transferring data between members of the group of wireless devices and the associated access node, based at least partly on the measurement response.

An example embodiment of the invention includes a method comprising:

receiving, by the wireless device, a directional beacon frame directed to a sector that includes members of the group of wireless devices associated with the associated access node; and transmitting, by the wireless device, an association request and receiving an association response from the associated access node, indicating that the wireless device has been allocated to the group of wireless devices associated with the associated access node.

An example embodiment of the invention includes an apparatus comprising:

at least one processor;

at least one memory including computer program code;

the at least one memory and the computer program code configured to, with the at least one processor, cause the apparatus at least to:

receive a measurement request from an associated access node, to perform measurement of at least one signal received from at least one other access node to which the apparatus is not associated, the apparatus being a member of a group of wireless devices based on reception by the wireless device of a directional beacon frame from the associated access node;

receiving during measurement, a directional message with an access node identifier of another access node to which the apparatus is not associated and determining a reception power of the directional message;

transmitting to the associated access node, a measurement response comprising information on the directional message; and receiving from the associated access node, an indication of a time window that may be used by the apparatus for transferring data between members of the group of wireless devices and the associated access node, based at least partly on the measurement response.

An example embodiment of the invention includes an apparatus comprising:

the at least one memory and the computer program code configured to, with the at least one processor, cause the apparatus at least to:

receive a directional beacon frame directed to a sector that includes members of the group of wireless devices associated with the associated access node; and transmit an association request and receive an association response from the associated access node, indicating that the apparatus has been allocated to the group of wireless devices associated with the associated access node.

An example embodiment of the invention includes a computer program product comprising computer executable program code recorded on a computer readable, non-transitory storage medium, the computer executable program code comprising:

code for receiving by a wireless device, a measurement request from an associated access node, to perform measurement of at least one signal received from at least one other access node to which the wireless device is not associated, the wireless device being a member of a group of wireless devices based on reception by the wireless device of a directional beacon frame from the associated access node;

code for receiving, by the wireless device during measurement, a directional message with an access node identifier of another access node to which the wireless device is not associated and determining a reception power of the directional message;

code for transmitting, by the wireless device, to the associated access node, a measurement response comprising information on the directional message; and code for receiving, by the wireless device, from the associated access node, an indication of a time window that may be used by the wireless device for transferring data between members of the group of wireless devices and the associated access node, based at least partly on the measurement response.

An example embodiment of the invention includes a method comprising:

transmitting, by an access node, a measurement request to an associated wireless device, to perform measurement of at least one signal received from at least one other access node to which the wireless device is not associated, the wireless device being a member of a group of wireless devices based on transmission by the access node to the wireless device, of a directional beacon frame;

receiving, by the access node from the wireless device, a measurement response comprising information on a directional message with an access node identifier of another access node to which the wireless device is not associated, the information including a reception power of the another directional beacon; and determining, by the access node, a time window that may be used by wireless devices that are members of the group of wireless devices, for transferring data between members of the group of wireless devices and the access node, based at least partly on the measurement response.

An example embodiment of the invention includes a method comprising:

transmitting, by the access node, to the associated wireless device, an indication of a time window that may be used by wireless devices that are members of the group of wireless devices, for transferring data between members of the group of wireless devices and the access node, based at least partly on the measurement response.

An example embodiment of the invention includes a method comprising:

transmitting, by the access node, to the associated wireless device, a directional beacon frame directed to a sector containing members of the group of wireless devices associated with the access node;

receiving, by the access node, an association request from the associated wireless device within certain time period;

adding, by the access node, the associated wireless device to the group corresponding to the sector; and transmitting, by the access node, an association response, to the associated wireless device, indicating the group to which the associated wireless device has been allocated.

An example embodiment of the invention includes a method comprising:

transmitting, by the access node, an omnidirectional beacon frame indicating a capability of subsequent directional transmissions; and indicating, by the access node, in the omnidirectional beacon frame, a time duration for omnidirectional and one or more subsequent directional transmissions, for channel protection.

An example embodiment of the invention includes a method comprising:

receiving, by the access node, an omnidirectional beacon from another access node and setting channel protection intervals for a channel, based on the received beacon; and monitoring, by the access node, the channel during directional transmission periods and overwriting the set channel protection for a subset of directional transmission in one or more directions, where received interference is below a received threshold and for a duration less than or equal to previously set channel protection intervals.

An example embodiment of the invention includes an apparatus comprising:

at least one processor;

at least one memory including computer program code;

the at least one memory and the computer program code configured to, with the at least one processor, cause the apparatus at least to:

transmit a measurement request to an associated wireless device, to perform measurement of at least one signal received from at least one other access node to which the wireless device is not associated, the wireless device being a member of a group of wireless devices based on transmission by the apparatus to the wireless device, of a directional beacon frame;

receive from the wireless device, a measurement response comprising information on a directional message with an access node identifier of another access node to which the wireless device is not associated, the information including a reception power of the another directional beacon; and determine a time window that may be used by wireless devices that are members of the group of wireless devices, for transferring data between members of the group of wireless devices and the apparatus, based at least partly on the measurement response.

An example embodiment of the invention includes an apparatus comprising:

the at least one memory and the computer program code configured to, with the at least one processor, cause the apparatus at least to:

transmit to the associated wireless device, an indication of a time window that may be used by wireless devices that are members of the group of wireless devices, for transferring data between members of the group of wireless devices and the apparatus, based at least partly on the measurement response.

An example embodiment of the invention includes an apparatus comprising:

the at least one memory and the computer program code configured to, with the at least one processor, cause the apparatus at least to:

transmit to the associated wireless device, a directional beacon frame directed to a sector containing members of the group of wireless devices associated with the apparatus;

receive an association request from the associated wireless device within certain time period;

add the associated wireless device to the group corresponding to the sector; and transmit an association response, to the associated wireless device, indicating the group to which the associated wireless device has been allocated.

An example embodiment of the invention includes an apparatus comprising:

the at least one memory and the computer program code configured to, with the at least one processor, cause the apparatus at least to:

transmit an omnidirectional beacon frame indicating a capability of subsequent directional transmissions; and indicate in the omnidirectional beacon frame, a time duration for omnidirectional and one or more subsequent directional transmissions, for channel protection.

An example embodiment of the invention includes an apparatus comprising:

the at least one memory and the computer program code configured to, with the at least one processor, cause the apparatus at least to:

receive an omnidirectional beacon from another access node and set channel protection intervals for a channel, based on the received beacon; and monitor the channel during directional transmission periods and overwrite the set channel protection for a subset of directional transmission in one or more directions, where received interference is below a received threshold and for a duration less than or equal to previously set channel protection intervals.

An example embodiment of the invention includes a computer program product comprising computer executable program code recorded on a computer readable, non-transitory storage medium, the computer executable program code comprising:

code for transmitting, by an access node, a measurement request to an associated wireless device, to perform measurement of at least one signal received from at least one other access node to which the wireless device is not associated, the wireless device being a member of a group of wireless devices based on transmission by the access node to the wireless device, of a directional beacon frame;

code for receiving, by the access node from the wireless device, a measurement response comprising information on a directional message with an access node identifier of another access node to which the wireless device is not associated, the information including a reception power of the another directional beacon; and code for determining, by the access node, a time window that may be used by wireless devices that are members of the group of wireless devices, for transferring data between members of the group of wireless devices and the access node, based at least partly on the measurement response.

An example embodiment of the invention includes a method comprising:

transmitting, by the access node, to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the access point supports sectorized transmission and when excessive interference is not caused to neighboring wireless devices.

An example embodiment of the invention includes a method comprising:

transmitting, by the access node, to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the access point supports sectorized transmission and when excessive interference is not caused to neighboring wireless devices; and transmitting, by the access node, directional data in the sector to the group of wireless devices occupying the sector.

An example embodiment of the invention includes an apparatus comprising:

the at least one memory and the computer program code configured to, with the at least one processor, cause the apparatus at least to:

transmit to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the apparatus supports sectorized transmission and when excessive interference is not caused to neighboring wireless devices.

An example embodiment of the invention includes an apparatus comprising:

the at least one memory and the computer program code configured to, with the at least one processor, cause the apparatus at least to:

transmit to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the apparatus supports sectorized transmission and when excessive interference is not caused to neighboring wireless devices; and transmit directional data in the sector to the group of wireless devices occupying the sector.

An example embodiment of the invention includes a method comprising:

receiving, by an access node, in a directional transmission sector of the access node, at least one interfering signal from at least one neighboring access node or from at least one neighboring wireless device associated with the at least one neighboring access node;

determining, by the access node, a different directional transmission sector of the access node, where transmissions by the access node in the different directional transmission sector will cause minimal interference to the at least one neighboring access node or the at least one neighboring wireless device associated with the at least one neighboring access node; and transmitting, by the access node, in the different directional transmission sector of the access node, to a group of wireless devices associated with the access node and occupying the different directional transmission sector, an indication of a time window that may be used by the wireless devices that are members of the group of wireless devices, for transferring data between members of the group of wireless devices and the access node, based at least partly on the determination by the access node.

An example embodiment of the invention includes an apparatus comprising:

at least one processor;

at least one memory including computer program code;

the at least one memory and the computer program code configured to, with the at least one processor, cause the apparatus at least to:

receive in a directional transmission sector of the apparatus, at least one interfering signal from at least one neighboring access node or from at least one neighboring wireless device associated with the at least one neighboring access node;

determine a different directional transmission sector of the apparatus, where transmissions by the apparatus in the different directional transmission sector will cause minimal interference to the at least one neighboring access node or the at least one neighboring wireless device associated with the at least one neighboring access node; and transmit in the different directional transmission sector of the apparatus, to a group of wireless devices associated with the apparatus and occupying the different directional transmission sector, an indication of a time window that may be used by the wireless devices that are members of the group of wireless devices, for transferring data between members of the group of wireless devices and the apparatus, based at least partly on the determination by the apparatus.

An example embodiment of the invention includes a computer program product comprising computer executable program code recorded on a computer readable, non-transitory storage medium, the computer executable program code comprising:

code for receiving, by an access node, in a directional transmission sector of the access node, at least one interfering signal from at least one neighboring access node or from at least one neighboring wireless device associated with the at least one neighboring access node;

code for determining, by the access node, a different directional transmission sector of the access node, where transmissions by the access node in the different directional transmission sector will cause minimal interference to the at least one neighboring access node or the at least one neighboring wireless device associated with the at least one neighboring access node; and code for transmitting, by the access node, in the different directional transmission sector of the access node, to a group of wireless devices associated with the access node and occupying the different directional transmission sector, an indication of a time window that may be used by the wireless devices that are members of the group of wireless devices, for transferring data between members of the group of wireless devices and the access node, based at least partly on the determination by the access node.

The resulting embodiments provide improved configuring of channel access windows in overlapping network environments.

DESCRIPTION OF THE FIGURES

FIG. 1A shows an example network diagram, wherein a wireless access point device transmits to an associated wireless device, a directional beacon frame directed to a sector containing members of the group of wireless devices associated with the access point. The access point receives an association request from the associated wireless device within certain time period. The access point adds the associated wireless device to the group corresponding to the sector. The access point transmits an association response, to the associated wireless device, indicating the group to which the associated wireless device has been allocated. The access point transmits a measurement request to the associated wireless device, to perform overlapping measurements of signals received from other access points to which the wireless device is not associated, the wireless device being a member of the group of wireless devices based on transmission by the access point to the wireless device, of a directional beacon frame. The access point receives a measurement response comprising information on the another directional beacon with an access point identifier of another access point to which the wireless device is not associated, the information including a reception power of the another directional beacon. The access point determines a time window that may be used by the wireless device for transferring data between members of the group of wireless devices and the access point, based at least partly on the measurement response. The access point the transmits to the associated wireless device, an indication of the time window that may be used by the wireless device, according to an example embodiment of the invention.

FIG. 3C is an example flow diagram of operational steps in the wireless access point device of FIG. 3A, wherein the access point is determining a different directional transmission sector of the access point, where transmissions by the access point in the different directional transmission sector will cause minimal interference to at least one neighboring access point or at least one neighboring wireless device associated with the at least one neighboring access node, according to an example embodiment of the invention.

DISCUSSION OF EXAMPLE EMBODIMENTS OF THE INVENTION

Figure 1B:
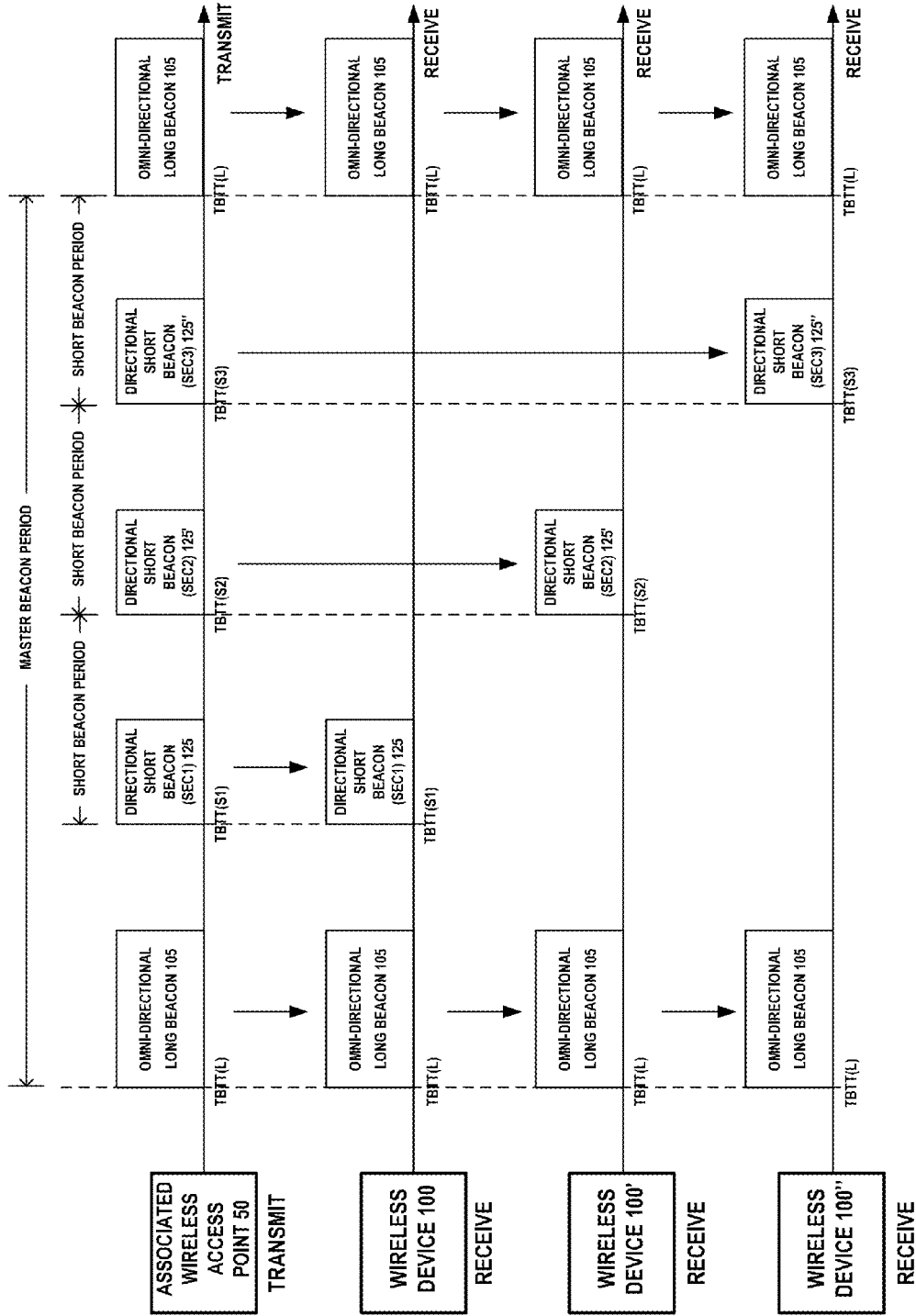
FIG. 1B shows an example timing diagram of the wireless access point device transmitting three directional beacon frames to three respective sectors containing members of three respective groups of associated wireless devices, according to an example embodiment of the invention.

This section is organized into the following topics:
A. WLAN Communication Technology
B. Signaling For Sectorized Beam Operation In Wireless Networks
C. Coordinated Beamforming For Mutually Interfering Multi-Antenna Networks
A. WLAN Communication Technology The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11 ac, and the planned IEEE 802.11 ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11ah WLAN standard is being developed for operation below 1 GHz and will have a greater range and lower obstruction losses due to its longer wavelength.

According to an example embodiment, an IEEE 802.11 WLAN may be organized as an independent basic service set (IBSS) or an infrastructure basic service set (BSS). The access point (AP) in an infrastructure basic service set (BSS) IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point (AP) in an Infrastructure BSS may bridge traffic out of the BSS onto a distribution network. STAs that are members of the BSS may exchange packets with the AP.

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

According to an example embodiment, an IEEE 802.11 WLAN may also be organized as an independent basic service set (IBSS). Wireless devices in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format may be identical to that of an IEEE 48-bit address. In an ad hoc network, the BSSID may be a locally administered, individual address that is generated randomly by the device that starts the ad hoc network.

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TGTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

A Traffic Indication Map (TIM) is a field transmitted in beacon frames, used to inform associated wireless client devices that the access point has buffered data waiting to be transmitted to them. Access points buffer frames of data for wireless client devices while they are sleeping in a low-power state. The access point transmits beacons at a regular interval, the target beacon transmission time (TBTT). The Traffic Indication Map (TIM) information element in the periodically transmitted beacon frame, indicates which wireless client devices have buffered data waiting to be accessed in the access point. Each frame of buffered data is identified by an association identifier (AID) associated with a specific wireless client device. The AID is used to logically identify the wireless client device to which buffered frames of data are to be delivered. The traffic indication map (TIM) contains a bitmap, with each bit relating to a specific association identifier (AID). When data is buffered in the access point for a particular association identifier (AID), the bit is "1". If no data is buffered, the bit for the association identifier (AID) is "0". Wireless client devices must wake up and listen for the periodic beacon frames to receive the Traffic Indication Map (TIM). By examining the TIM, a wireless client device may determine if the access point has buffered data waiting for it. To retrieve the buffered data, the wireless client device may use a power-save poll (PS-Poll) frame. After transmitting the PS-Poll frame, the client mobile station may stay awake until it receives the buffered data or until the bit for its association identifier (AID) in the Traffic Indication Map (TIM) is no longer set to "1", indicating that the access point has discarded the buffered data.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode may send a trigger frame to the AP when the STA wakes up, to retrieve any queued data at the AP. In S-APSD, the AP assigns a schedule to a STA and the STA wakes up, sends a power save poll packet to the AP in order to retrieve from the AP any data queued. An AP may maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

The IEEE 802.11ah WLAN standard operating below 1 GHz, has a greater range and lower obstruction losses due to its longer wavelength. IEEE 802.11ah provides wireless LAN operation in the sub-1 GHz range considered appropriate for sensor networks, machine-to-machine, cellular offload, and smart grid applications. IEEE 802.11ah defines three use case categories:

Use Case 1: Sensors and meters;
Use Case 2: Backhaul sensor and meter data; and
Use Case 3: Extended range Wi-Fi A principal application of IEEE 802.11ah is sensor networks, for example in smart metering, where the measurement information at each sensor node may be transmitted to an access point. In example sensor applications, the data packet size may be a few hundred bytes, the sensors may have a low duty-cycle, transmitting data every few minutes, and the number of sensor devices may be as large as 6000 devices communicating with an access point.

The IEEE 802.11ah WLAN standard organizes the STAs associated to a network, into groups. The association response frame transmitted by the access point device, indicates the group ID, along with the conventional association ID (AID) field that associates the STA to the access point. The group IDs may be numbered in descending order of group priority for quality of service (QoS) STAs. The access point may base its group ID number for the case of non-QoS STAs on their respective association times. In this manner, the access point may determine which STAs are members of which group. Based on the association request frame from a new requesting STA, the access point either uses QoS parameters or non-QoS parameters, such as proximity, to decide to which group the new STA is a member. The corresponding group ID of the group to which the new STA is assigned is then sent by the access point to the STA in response to the association request message. The association response frame indicates the group ID, along with the conventional AID field that associates the STA to the access point.

The IEEE 802.11ah WLAN standard includes Synchronized Distributed Coordination Function (DCF) uplink channel access by STAs. The association response frame transmitted by the access point, defines a restricted access period, referred to as a restricted access window (RAW). Each restricted access window comprises multiple time slots and each time slot is allocated to STAs paged in the traffic indication map (TIM). Uplink data transmissions, such as PS-polling operations, may be facilitated by transmitting the packet in a time slot in an uplink restricted access window. Downlink data transmission may be facilitated by the transmission of data packets in a downlink restricted access window. An example procedure for uplink channel access may include:

An awakened STA that decodes the beacon, sends a PS-Poll packet when its traffic indication map (TIM) bit is set to one;

The STA may determine its channel time slot in an uplink restricted access window based on its AID bit position in the traffic indication map (TIM);

The STA may contend for access to the time slot with other STAs in the same group;

After resolving PS-Polls from STAs, the access point broadcasts a downlink allocation packet that is positioned after the uplink restricted access window and before the downlink restricted access window, which includes a Block ACK, the duration of downlink restricted access window, and/or allocated downlink time slot for the STAs.

The access point includes in its transmitted beacon frame, a Grouping Parameter Set information element to informs the STAs within a group of [1] the interval they may sleep before they may contend for the medium and [2] their medium access duration. The Grouping Parameter Set element may include: [1] the group ID; [2] a prohibition interval; and [3] a group interval end time. The group interval end time, as the name implies, specifies the instant following the start of the beacon, at which the uplink restricted access window terminates, which applies to all STAs in the relevant group. The prohibition interval specifies the interval from the group's end time to its next start time at which members of the group are allowed to contend for the radio medium. The Grouping Parameter Set information element in the beacon frame enables the access point to place a given STA in one group in one beacon frame and move that STA to another group in the next consecutive beacon frame.

The IEEE 802.11ah WLAN standard includes Short Beacon frame format. The Beacon Interval is an integer multiple of the Short Beacon Interval. The Short Beacon includes a compressed SSID field. The Short Beacon includes a 4 byte Timestamp containing the 4 LSBs of the AP Timestamp, a 1 byte Change Sequence Field that is incremented whenever critical network information changes, and a field indicating the time of next full beacon, if an AP transmits full (long) Beacon frames periodically.

B. Signaling for Sectorized Beam Operation in Wireless Networks

In sensor networks and smart grid applications, large numbers of wireless client devices, both fixed and mobile, will need to communicate with an access point device. In the case of IEEE 802.11 ah networks, it is envisioned to have a Wi-Fi network of 6000 wireless client devices (STAs) being served by an access point (AP). The client devices may operate on battery power and must conserve their power during long periods of inactivity punctuated by short durations of communication sessions. The wireless client devices will need to awaken periodically to receive a beacon, to determine if the access point has buffered data for them.

Currently, the IEEE 802.11 ah wireless standard provides coverage to thousands of wireless client devices spanning a cell radius of over one kilometer. The wireless client devices may be grouped such that all the nodes do not simultaneously try to access the channel, but rather a subset of wireless client devices in a group contend for the channel at a time. The concept of grouping may be extended to include physical grouping of the wireless client devices in sectors radiating from the access point device.

FIG. 1A shows an example network diagram, in accordance with an embodiment of the invention, wherein a wireless access point device 50 in BSS 70, transmits a directional beacon frame 125 directed to a sector, sector(1), containing members of the group, block 1, of associated wireless devices 100, 100b, and 100c, associated with the access point 50. Up to 64 associated wireless devices, for example, may be allocated to sector(1) in the group, block 1. The access point 50 receives an association request from the associated wireless device 100 in sector(1), within certain time period. The access point 50 may add the associated wireless device 100 to the group, block 1, corresponding to the sector(1). The access point 50 transmits an association response to the associated wireless device 100, indicating the group, block 1, to which the associated wireless device 100 has been allocated by the access point 50. FIG. 1A shows the grouping of wireless client devices in sectors radiating from the access point device 50, with the group block 1 of associated wireless devices 100, 100*b*, and 100*c* located in sector(1), the group block 2 of associated wireless devices 100', 100'*b*, and 100'*c* located in sector(2), and the group block 3 of associated wireless devices 100", 100"*b*, and 100"*c* located in sector(3). The access point 50 may be connected to a backbone network 60.

In an example embodiment of the invention, the same SSID may be used for all three sectors in the figure, and the sector ID may be used in the beacon 125 to indicate the corresponding sector, thereby enabling the access point 50 to dynamically change the sectors to which different groups of wireless devices belong. This may be done by sector/group re-assignment.

The access point 50 transmits a measurement request to the associated wireless device 100, to perform overlapping measurements of signals in the sector(1) received from other access points to which the wireless device 100 is not associated. The access point 50 receives a measurement response from wireless device 100, comprising information on another directional beacon 135 with an access point identifier, SSID=X and/or sector ID, of another access point 55 to which the wireless device 100 is not associated. The information in the measurement response may include a reception power of the another directional beacon 135. The beacon 135 is one example embodiment, but the message 135 may also be some other frame from the another access point 55, such as a probe response or measurement pilot, or some other frame. The access point 55 may be connected to a backbone network 65.

In an example embodiment of the invention, the access point 50, itself, may measure the channel when a neighboring access point 55 is performing sectorized transmission, as shown in FIG. 1A. The periodic omni-directional long beacon and its time stamp transmitted by the neighboring access point 55 may help the access point 50 anticipate when short directional beacons 135 may be transmitted by the neighboring access point 55 in a corresponding sector 115 of the neighboring access point 55. By measuring the interference received, the access point 50 may decide whether it may, itself, perform sectorized transmission in an overlapping sector 105. This may be done from time to time by the access point 50, and the measurements may be updated. If sectorization is static, measurements by the access point 50 of interference by the neighboring access point 55 may be performed occasionally. Once the access point 50 learns the pattern of occurrences of interference that it receives from the neighboring access point 55, by the process of decoding the SSID (and corresponding sector ID) of the beacon received from the neighboring access point 55, the access point 50 will anticipate when it may access the channel.

The access point 50 determines a time window 130 (shown in FIG. 1D) that may be used by the wireless device 100 for transferring data between members of the group, block 1, of wireless devices and the access point 50, based at least partly on the measurement response from the wireless device 100. The time window 130 is for the group, block 1, of wireless devices, for transferring data between members of the group, block 1, of wireless devices and the access point 50.

The access point 50 the transmits to the associated wireless device 100, an indication of the time window 130 (shown in FIG. 1D) that may be used by the wireless device 100 to avoid or reduce the effects of interference by the interfering beacon 135, according to an example embodiment of the invention.

FIG. 1B shows an example timing diagram of the access point device 50 transmitting three directional beacon frames 125, 125', and 125" to three respective sectors, sector(1), sector(2), and sector(1), containing members of three respective groups, block 1, block 2, and block 3, of associated wireless devices, according to an example embodiment of the invention. The master beacon interval may begin at the transmission of the omni-directional long beacon 105 at TBTT(L) by access point device 50 and continue until the next periodic transmission of the omni-directional long beacon 105 by access point device 50. The master beacon interval is an integer multiple of the short beacon interval. A short beacon interval may begin at the transmission of a directional short beacon 125 toward sector(1) at TBTT(S1) and continue until the next periodic transmission of the next directional short beacon 125' toward sector(2) at TBTT(S2). The next short beacon interval may begin at the transmission of the directional short beacon 125' toward sector(2) at TBTT(S2) and continue until the next periodic transmission of the next directional short beacon 125" toward sector(3) at TBTT(S3). The figure shows wireless device 100 in sector(1) receiving directional short beacon 125 at TBTT(S1). The figure shows wireless device 100' in sector(2) receiving directional short beacon 125' at TBTT(S2). The figure shows wireless device 100" in sector(3) receiving directional short beacon 125" at TBTT(S3).

In an example embodiment of the invention, the short beacon 125 may not be directional, but instead, the data transmitted by the access point 50 during the short beacon period of the beacon 125 may, itself, be directional. Similarly, the data transmitted by the neighboring access point 55 in an interfering sector 115, may be directional. For example, the access point 50, based on its own measurement in its sector (1), may decide to transmit directional data in sector(1) and only the group of wireless devices in block 1 occupying that sector(1), are able to receive the directional data and thus may access the channel. This is a form of implicit grouping with sectorization. In an example embodiment of the invention, the sectorized access point 50 may enable the group of wireless devices of block 1 occupying sector(1), to ignore any Request to Send (RTS) and Clear to Send (CTS) signals transmitted by the neighboring access point 55 for sectorized transmission. In an example embodiment of the invention, an access point 50 supporting sectorized transmission, may override the RTS/CTS of its neighbors, when such override in a sector does not cause excessive interference to its neighbors.

Figure 1C:
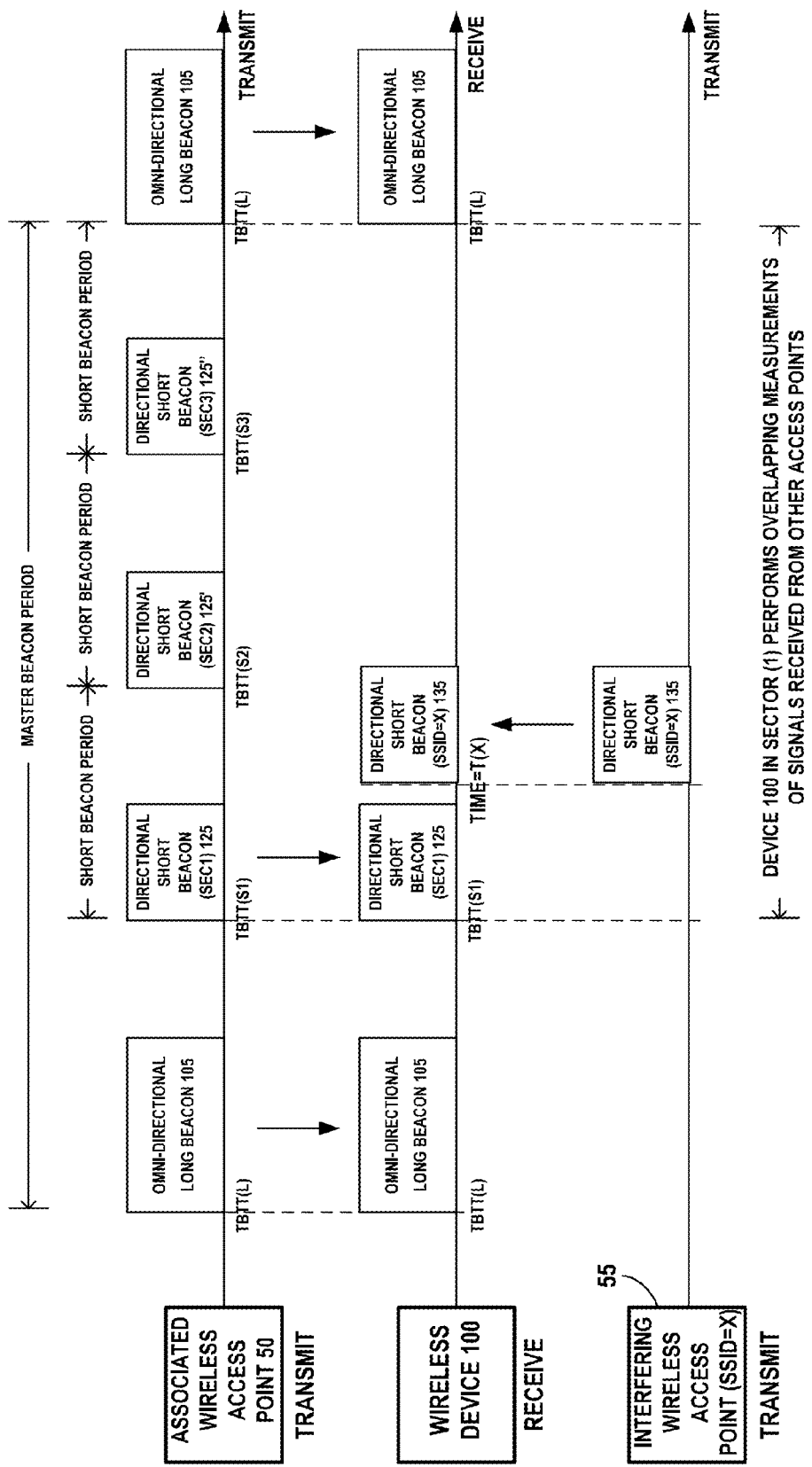
FIG. 1C shows an example timing diagram of the associated wireless device performing overlapping measurements of signals received from another access point to which the wireless device is not associated, in response to a request from the associated access point, according to an example embodiment of the invention.
Figure 1D:
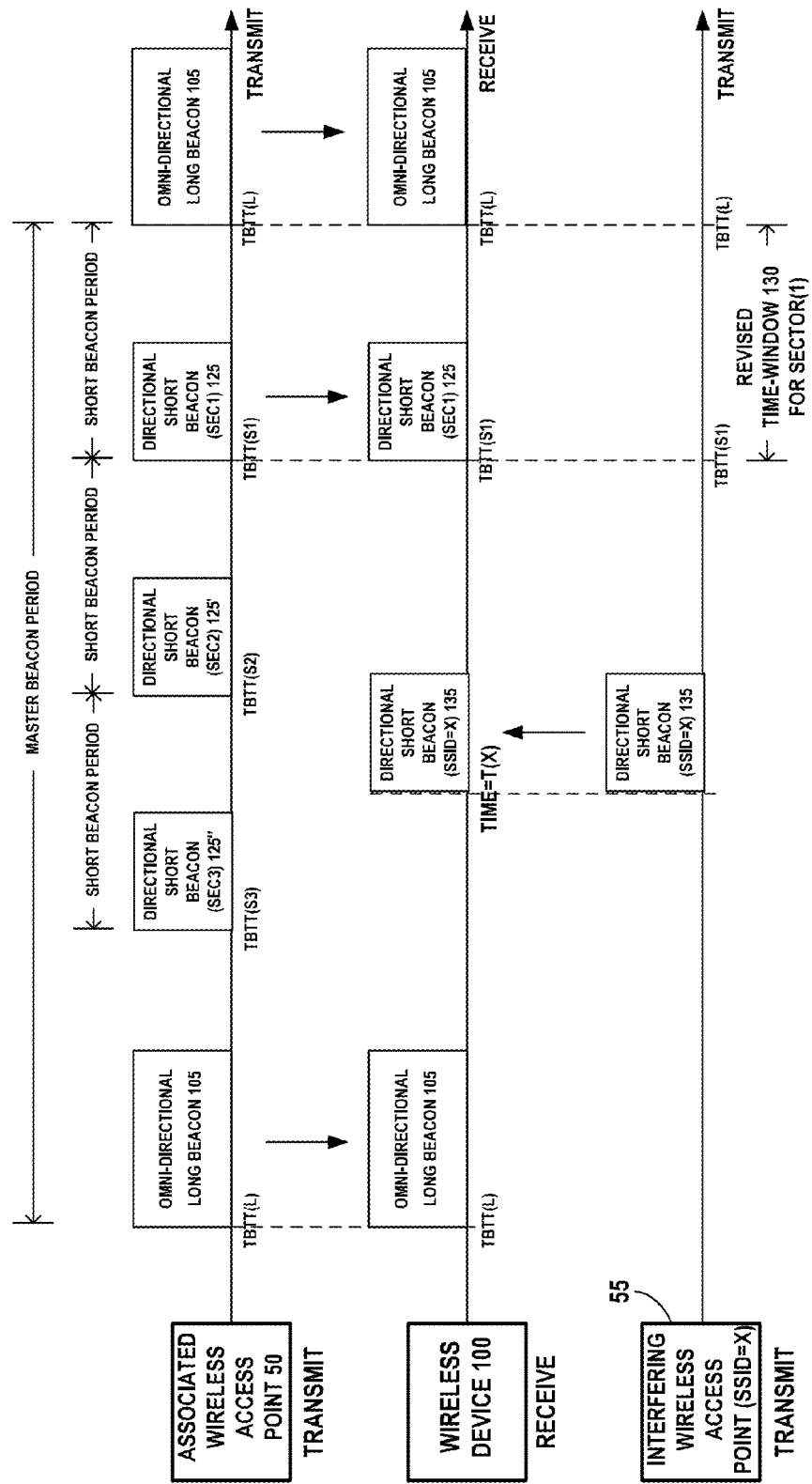
FIG. 1D shows an example timing diagram of the access point determining a time window that may be used by the wireless device for transferring data between members of the group of wireless devices and the access point, based at least partly on the measurement response received from the wireless device, according to an example embodiment of the invention.
Figure 1E:
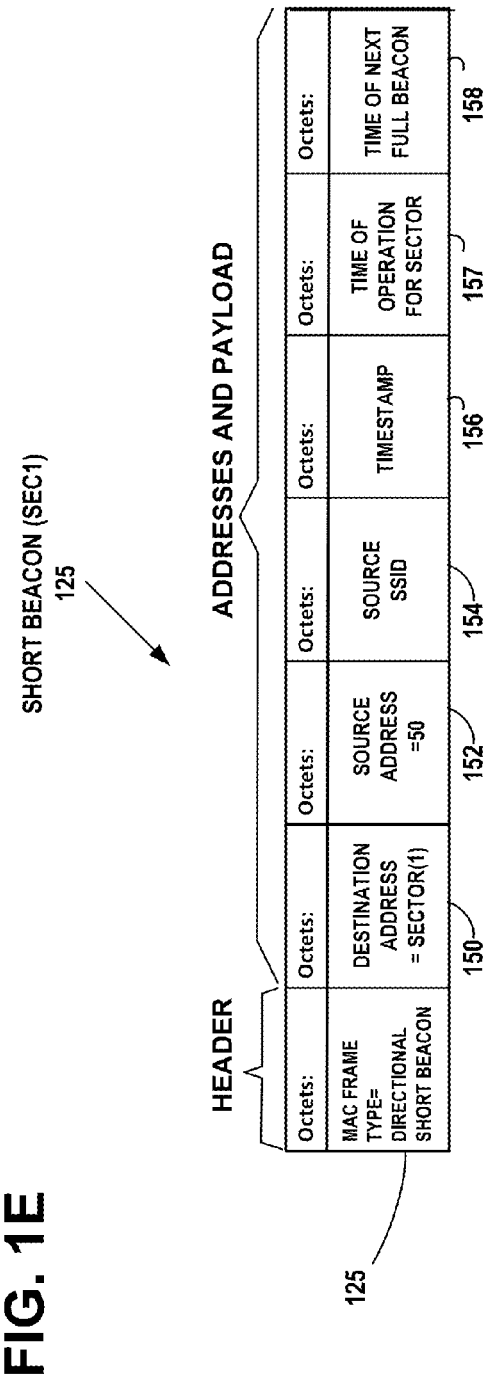
FIG. 1E shows an example frame structure of the directional beacon frame directed to a sector containing members of the group of wireless devices associated with the access point, according to an example embodiment of the invention.
Figure 1F:
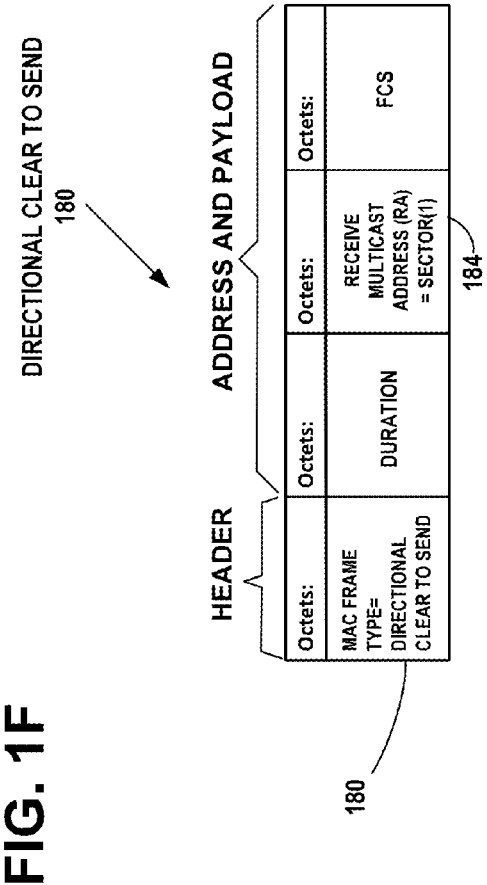
FIG. 1F shows an example frame structure of the directional clear to send frame directed to sector(1) containing members of the group of wireless devices associated with the access point, according to an example embodiment of the invention.

FIG. 1F shows an example frame structure of the directional clear to send frame 180 directed to sector(1) containing members of the group, block 1, of wireless devices associated with the access point 50, according to an example embodiment of the invention. In an example embodiment of the invention, a new field 184 for the sector ID, may be introduced to RTS/CTS packets, which indicates to which sector the RTS/CTS pertains. In an example embodiment of the invention, a new CTS frame 180 may be introduced; a modified CTS message 180 that allows a subset of STAs to access the channel, the subset being defined by the sector that is indicated in the receive multicast address (RA) 184 of the CTS message. When sectorization is allowed, the access point 50 may start by transmitting this modified CTS frame allowing access to a subset of the group of wireless devices in block 1 occupying that sector(1), which belong to the particular sector. In an example embodiment of the invention, the directional clear to send frame 180 may be a null data packet (NDP)-CTS packet or short CTS packet, containing a new field for the sector ID, which indicates to which sector the RTS/CTS pertains.

FIG. 1C shows an example timing diagram of the associated wireless device 100 performing overlapping measurements of signals, for example the directional short beacon 135, received from the another access point 55, to which the wireless device 100 is not associated, in response to the request for measurement from the associated access point 50, according to an example embodiment of the invention. Device 100 in sector(1) performs overlapping measurements of the signals received from other access device 55 and detects the directional short beacon 135 at the time T(X). The directional short beacon 135 has an SSID=X, indicating that is from a different BSS. In accordance with an example embodiment of the invention, device 100 is shown performing the overlapping measurements for at least three short beacon periods. The directional short beacon 135 is shown being received by device 100 in sector(1) within the short beacon period from TBTT(S1) to TBTT(S2) allocated to the wireless devices in block 1. In accordance with an embodiment of the invention, the device 100 measures and determines at least the reception power of the of the directional short beacon 135. The device 100 transmits to the associated access point 50, a measurement response comprising information on the directional short beacon 135.

FIG. 1D shows an example timing diagram of the access point 50 determining the time window 130 that may be used by the wireless device 100 for transferring data between members of the group, block 1, of wireless devices and the access point 50, based at least partly on the measurement response received from the wireless device 100, according to an example embodiment of the invention. In accordance with an example embodiment of the invention, device 100 has reported in the measurement response that the directional short beacon 135 is being received by device 100 in sector(1) within the short beacon period from TBTT(S1) to TBTT(S2) allocated to the wireless devices in block 1 and with a certain measured reception power. In accordance with an embodiment of the invention, based at least partly on the measurement response received from the wireless device 100, the access point 50 determines that the time window 130 is not affected by interference from the other access point 55 and thus that time window 130 may be used by the wireless device members of the group, block 1, in sector(1), for transferring data between members of the group, block 1, of wireless devices and the access point 50. The access point 50 transmits to the associated wireless device 100, an indication of the time window that may be used by wireless devices that are members of the group, block 1, of wireless devices, for transferring data between members of the group of wireless devices and the access point 50.

FIG. 1E shows an example frame structure of the directional short beacon frame 125 directed to sector(1) containing members of the group, block 1, of wireless devices associated with the access point 50, according to an example embodiment of the invention. In an example embodiment of the invention, the directional short beacon frame 125 includes field 150 for the destination sector(1), field 152 for the source address of the access point 50, field 154 for the source SSID of the access point 50, field 156 for the timestamp when the access point 50 sent the beacon, field 157 for the time of operation for wireless device members of the group in the sector, and field 158 for the time of the next full beacon.

In accordance with an example embodiment of the invention, the signaling method enables robust sectorized operation in Wi-Fi networks, such that the hidden nodes and collisions may be reduced.

In accordance with an example embodiment of the invention, channel access allows stations associated with different sectors of an access point to transmit simultaneously. In accordance with an example embodiment of the invention, the method of signaling informs overlapping BSS (OBSS) devices (both access points and wireless devices) that sectorization is being performed by a neighboring access point, and hence, the method may overrule the RTS-CTS operation, if it does not interfere with neighboring networks. In accordance with an example embodiment of the invention, the method may be used for self organization of time and/or sectors of neighboring access points.

In accordance with an example embodiment of the invention, the long beacon (one every master period) is transmitted with an omni-directional antenna, and the short beacons (number of periods within master period) are transmitted with one or more directional antennas. The short beacons are transmitted one at the time, so that there will be one short beacon transmission time per each sector.

In accordance with an example embodiment of the invention, the associated access point learns which of its sectors are overlapping with sectors of neighboring access points. The associated access point may then determine channel access windows per the sectors and groups so that the channel access windows for overlapping sectors may be revised so as to not be overlapping in time. The channel access windows may be configured so that in overlapping sectors, the possibility of access appears in different time moments.

In accordance with an example embodiment of the invention, control signaling may be provided between neighboring access points to assist in decision making.

In accordance with an example embodiment of the invention, the wireless device 100 may perform the following steps:

Receiving a directional beacon frame (beacon comprises a parameter indicating whether the beacon is directional or omnidirectional).

Transmitting an association request.

Receiving an association response, indicating a group to which the STA has been allocated.

Receiving a measurement request to perform overlapping BSS measurement.

During measurement, receiving another directional beacon with SSID/BSSID to which the STA is not associated & determining the reception power of the another directional beacon.

Transmitting a measurement response comprising information on the another directional beacon to the AP.

Receiving a frame indicating which time window may be used for transferring data between STAs of the group and the AP, wherein the time window is based at least partly on the measurement response.

In accordance with an example embodiment of the invention, the access point 50 may perform the following steps:

Transmitting a directional beacon frame (beacon comprises a parameter indicating whether the beacon is directional or omnidirectional).

Receiving an association request (from the sector to which the directional beacon was sent) within certain time period.

Adding the STA to a group corresponding to the sector.

Transmitting an association response, indicating a group to which the STA has been allocated.

Transmitting a measurement request to perform overlapping BSS measurement (measurement duration at least 3 times (short) beacon period).

Receiving a measurement response comprising information on another directional beacon.

Determining a time window for transferring data between the STAs of the group and the AP.

Transmitting a frame to the direction, indicating the time window available for the group, wherein the time window is based at least partly on the measurement response.

In accordance with an example embodiment of the invention, the access point 50 may include the following features:

Transmission of an omnidirectional beacon frame indicating the capability of subsequent directional transmission.

Indicating in the omnidirectional beacon frame the time duration for omnidirectional and subsequent directional transmission for channel protection.

Receiving the omnidirectional beacon from a neighboring AP and setting the channel protection intervals based on the received beacon.

Monitoring the channel during the subsequent directional transmission periods and overwriting the set channel protection for a subset of directional transmission in the direction(s) where the received interference is below a received threshold and for a duration less than equal to the previously set channel protection intervals.

In accordance with an example embodiment of the invention, the access point 50 shown in FIG. 1A, may, itself, monitor interfering signals 135 in its directional transmission sector 105 from at least one neighboring access point 55 or from at least one neighboring wireless device 100X (shown in FIG. 5) associated with neighboring access point 55. The access point 50 may determine a different directional transmission sector 105', where transmissions 125' by the access point 50 in the different directional transmission sector 105' will cause minimal interference to the at least one neighboring access point 55 or the at least one neighboring wireless device 100X (shown in FIG. 5) associated with the at least one neighboring access point 55, according to an example embodiment of the invention.

The access point 50 may receive in the directional transmission sector 105 of the access point 50, at least one interfering signal 135 from at least one neighboring access point 55 or from at least one neighboring wireless device 100X associated with the at least one neighboring access point 55.

The access point 50 may determine a different directional transmission sector 105' of the access point 50, where transmissions by the access point 50 in the different directional transmission sector 105' will cause minimal interference to the at least one neighboring access point 55 or the at least one neighboring wireless device 100X associated with the at least one neighboring access point 55.

The access point 50 may transmit short beacon 125' in the different directional transmission sector 105' of the access point 50, to a group, block 2, of wireless devices 100', 100'b, and 100'c associated with the access point 50 and occupying the different directional transmission sector 105'. An indication in the short beacon 125' indicates of a time window that may be used by the wireless devices 100', 100'b, and 100'c that are members of the group, block 2, of wireless devices, for transferring data between members of the group of wireless devices and the access point 50. The indication may be based, at least partly on the determination by the access point 50 of the different directional transmission sector 105' that will cause minimal interference to the at least one neighboring access point 55 or the at least one neighboring wireless device 100X.

Figure 2A:
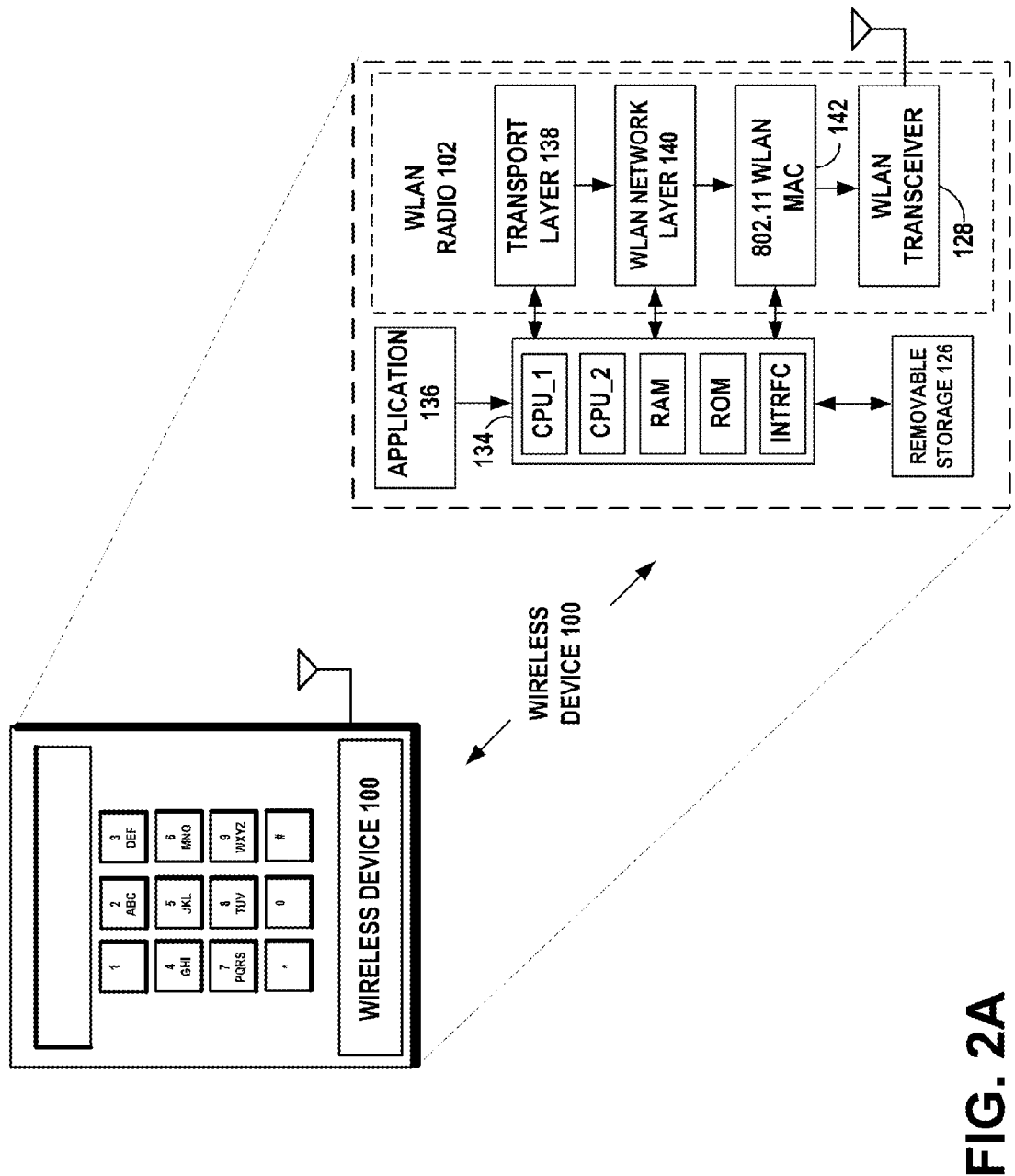
FIG. 2A is an example functional block diagram, illustrating an example wireless device, according to an example embodiment of the invention.

FIG. 2A is an example functional block diagram, illustrating an example wireless client device 100, according to an example embodiment of the invention. The example wireless client device 100 may include a processor 134 that may include a dual or multi-core central processing unit CPU_1 and CPU_2, a RAM memory, a ROM memory, and an interface for a keypad, display, and other input/output devices. The example wireless client device 100 may include a protocol stack, including the transceiver 128 and IEEE 802.11 MAC 142, which may be based, for example, on the IEEE 802.11ah WLAN standard. The protocol stack may also include a network layer 140, a transport layer 138, and an application program 136.

Figure 4:
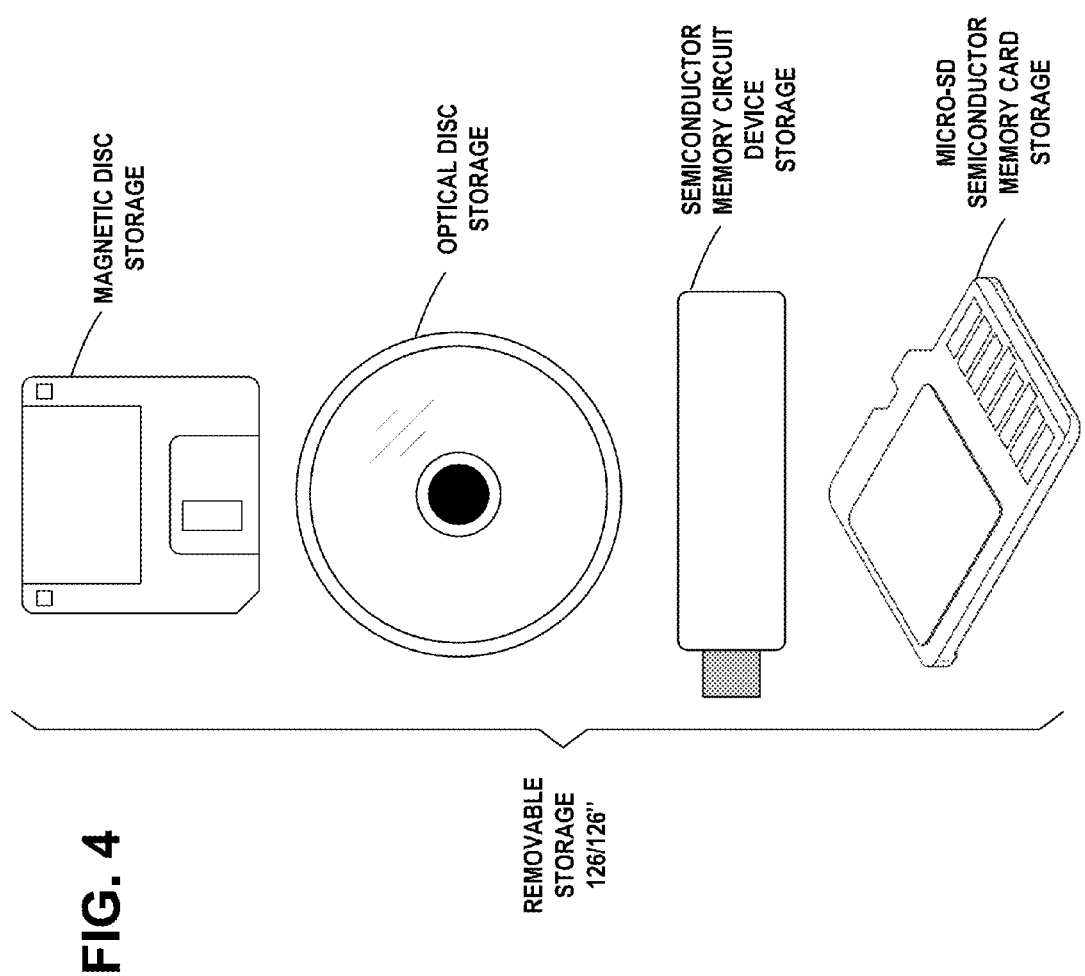
FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment, the interface circuits in FIG. 2A may interface with one or more radio transceivers, battery and other power sources, key pad, touch screen, display, microphone, speakers, ear pieces, camera or other imaging devices, etc. The RAM and ROM may be removable memory devices 126 such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126, as shown in FIG. 4, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 2B:
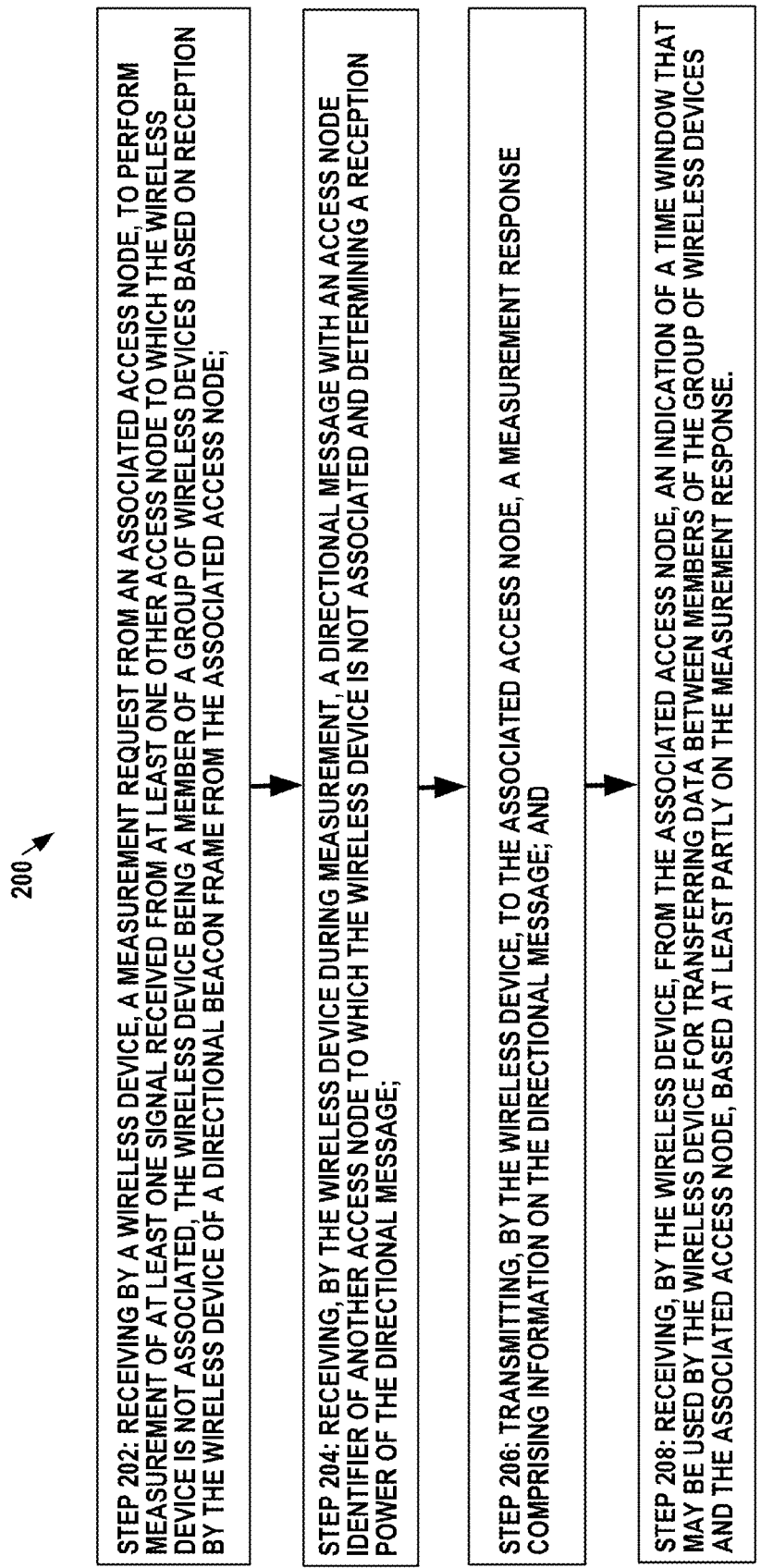
FIG. 2B is an example flow diagram of operational steps in the wireless device of FIG. 2A, wherein the associated wireless device is performing overlapping measurements of signals received from another access point to which the wireless device is not associated, in response to a request from the associated access point, according to an example embodiment of the invention.

FIG. 2B is an example flow diagram 200 of operational steps in the wireless client device 100 of FIG. 2A, according to an example embodiment of the invention.

The steps of the flow diagram 200 of FIG. 2B may represent computer code instructions stored in the RAM and/or ROM memory of the wireless client device 100, which when executed by the central processing units (CPU), carry out the functions of an example embodiment of the invention. The steps may be carried out in another order than shown and individual steps may be combined or separated into component steps.

Step 202: receiving by a wireless device, a measurement request from an associated access node, to perform measurement of at least one signal received from at least one other access node to which the wireless device is not associated, the wireless device being a member of a group of wireless devices based on reception by the wireless device of a directional beacon frame from the associated access node;

Step 204: receiving, by the wireless device during measurement, a directional message with an access node identifier of another access node to which the wireless device is not associated and determining a reception power of the directional message;

Step 206: transmitting, by the wireless device, to the associated access node, a measurement response comprising information on the directional message; and Step 208: receiving, by the wireless device, from the associated access node, an indication of a time window that may be used by the wireless device for transferring data between members of the group of wireless devices and the associated access node, based at least partly on the measurement response.

Figure 3A:
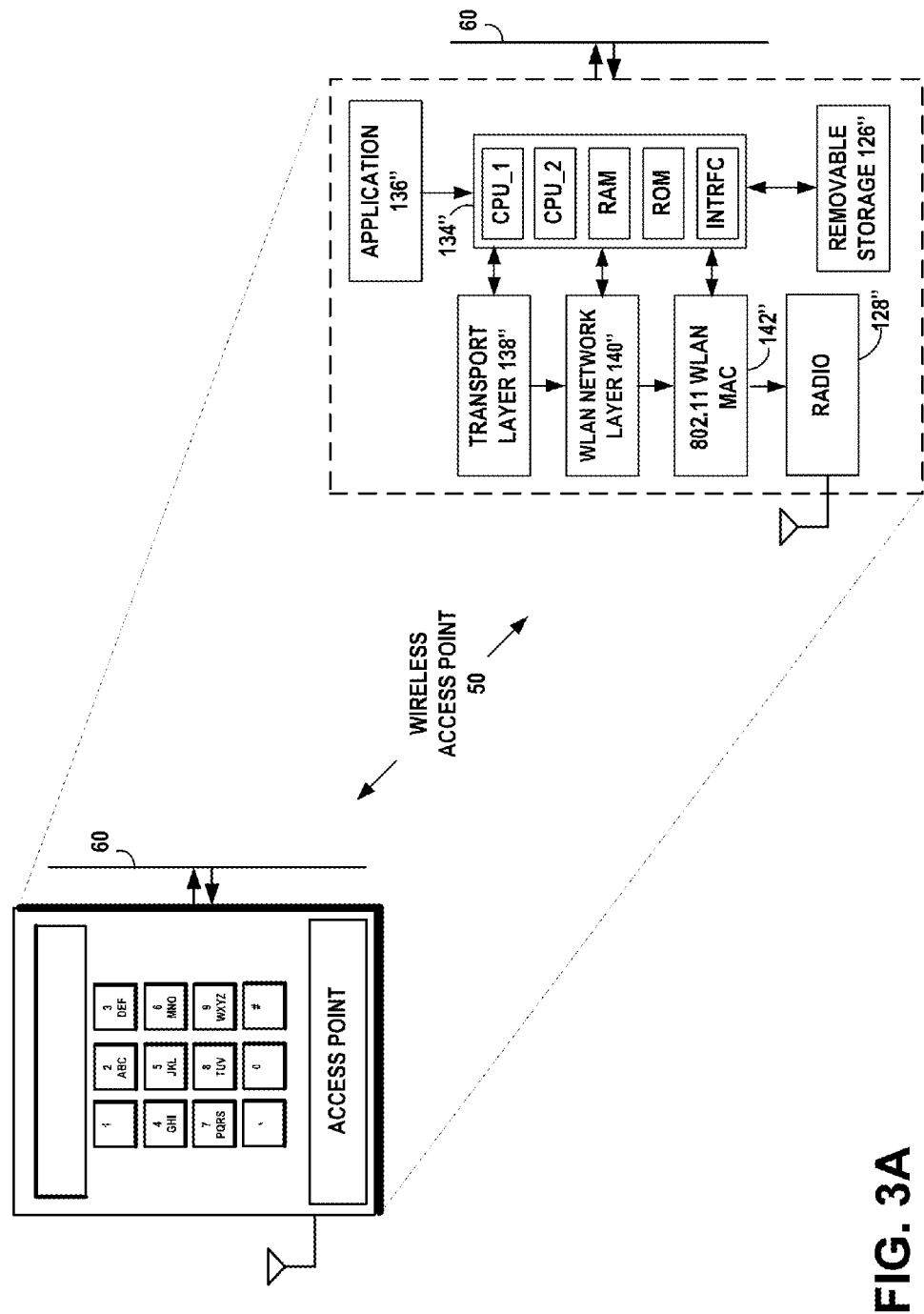
FIG. 3A is an example functional block diagram, illustrating an example wireless access point device, according to an example embodiment of the invention.

FIG. 3A is an example functional block diagram, illustrating an example wireless access point device 50, according to an example embodiment of the invention. The example wireless access point device 50 may include a processor 134" that may include a dual or multi-core central processing unit CPU_1 and CPU_2, a RAM memory, a ROM memory, and an interface for a keypad, display, and other input/output devices. The example wireless access point device 50 may include a protocol stack, including the transceiver 128" and IEEE 802.11ah MAC 142", which may be based, for example, on the IEEE 802.11 ah WLAN standard. The protocol stack may also include a network layer 140", a transport layer 138", and an application program 136".

In an example embodiment, the interface circuits in FIG. 3A may interface with one or more radio transceivers, battery and other power sources, key pad, touch screen, display, microphone, speakers, ear pieces, camera or other imaging devices, etc. The RAM and ROM may be removable memory devices 126" such as smart cards, SIMs, WIMs, semiconductor memories such as RAM, ROM, PROMS, flash memory devices, etc. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor. An example of removable storage media 126", as shown in FIG. 4, may be based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 3B:
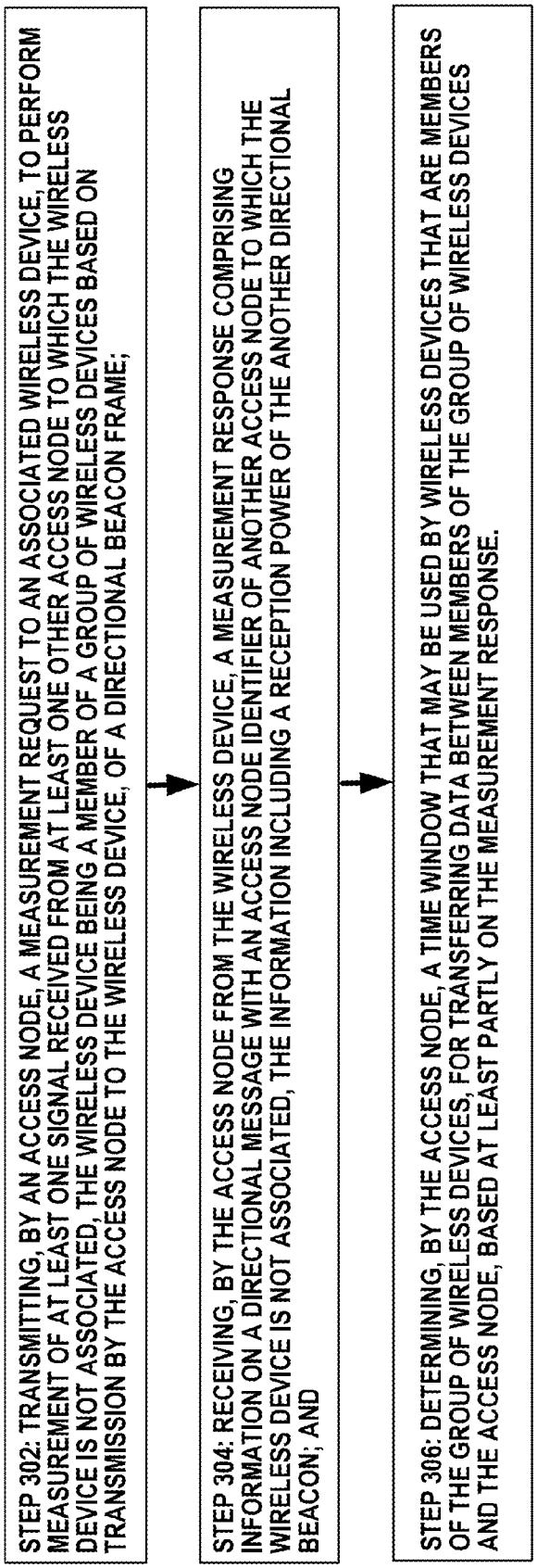
FIG. 3B is an example flow diagram of operational steps in the wireless access point device of FIG. 3A, wherein the access point is determining a time window that may be used by the wireless device for transferring data between members of the group of wireless devices and the access point, based at least partly on the measurement response received from the wireless device, according to an example embodiment of the invention.

FIG. 3B is an example flow diagram 300 of operational steps in the wireless access point device 50 of FIG. 3A, according to an example embodiment of the invention.

The steps of the flow diagram 300 of FIG. 3B may represent computer code instructions stored in the RAM and/or ROM memory, which when executed by the central processing units (CPU), carry out the functions of an example embodiment of the invention. The steps may be carried out in another order than shown and individual steps may be combined or separated into component steps.

Step 302: transmitting, by an access node, a measurement request to an associated wireless device, to perform measurement of at least one signal received from at least one other access node to which the wireless device is not associated, the wireless device being a member of a group of wireless devices based on transmission by the access node to the wireless device, of a directional beacon frame;

Step 304: receiving, by the access node from the wireless device, a measurement response comprising information on a directional message with an access node identifier of another access node to which the wireless device is not associated, the information including a reception power of the another directional beacon; and Step 306: determining, by the access node, a time window that may be used by wireless devices that are members of the group of wireless devices, for transferring data between members of the group of wireless devices and the access node, based at least partly on the measurement response.

FIG. 3C is an example flow diagram 350 of operational steps in the wireless access point device 50 of FIG. 3A, wherein the access point 50 is determining a different directional transmission sector 105' of the access point 50, where transmissions by the access point 50 in the different directional transmission sector 105' will cause minimal interference to at least one neighboring access point 55 or at least one neighboring wireless device 100X (shown in FIG. 5) associated with the at least one neighboring access node 55, according to an example embodiment of the invention.

The steps of the flow diagram 350 of FIG. 3C may represent computer code instructions stored in the RAM and/or ROM memory, which when executed by the central processing units (CPU), carry out the functions of an example embodiment of the invention. The steps may be carried out in another order than shown and individual steps may be combined or separated into component steps.

Step 352: receiving, by an access node, in a directional transmission sector of the access node, at least one interfering signal from at least one neighboring access node or from at least one neighboring wireless device associated with the at least one neighboring access node;

Step 354: determining, by the access node, a different directional transmission sector of the access node, where transmissions by the access node in the different directional transmission sector will cause minimal interference to the at least one neighboring access node or the at least one neighboring wireless device associated with the at least one neighboring access node; and Step 356: transmitting, by the access node, in the different directional transmission sector of the access node, to a group of wireless devices associated with the access node and occupying the different directional transmission sector, an indication of a time window that may be used by the wireless devices that are members of the group of wireless devices, for transferring data between members of the group of wireless devices and the access node, based at least partly on the determination by the access node.

FIG. 4 illustrates an example embodiment of the invention, wherein examples of removable storage media 126 and 126" are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, with the use of sectorization, two sectors (of the same or different AP) may simultaneously transmit, if there is sufficient spatial isolation. In an example embodiment of the invention, the RTS and/or CTS message may include the sector ID by which only STAs within the same sector set the NAV, while allowing the neighboring STAs in different sectors (same or different AP) to use the channel. In an example embodiment of the invention, the RTS/CTS may be considered multi-cast RTS/CTS that are obeyed by only a subset of STA's that receiving them. In an example embodiment of the invention, the RA address of the RTS/CTS message, may be a multicast address or sector ID.

In an example embodiment of the invention, a new field for the sector ID, may be introduced to RTS/CTS packets, which indicates to which sector the RTS/CTS pertains. The sector may be defined by the sector ID that is indicated in the receive multicast address (RA) of the CTS message. When sectorization is allowed, the access point 50 may start by transmitting this modified CTS frame allowing access to a subset of the group of wireless devices in block 1 occupying that sector(1), which belong to the particular sector.

In an example embodiment of the invention, an example of the self organization that may be achieved with the proposed scheme is given below. For instance, a first AP may indicate that it intends to use the channel during time intervals t1 to t3. Now a second AP may request measurement reports from its STAs and group them into different sectors based on how much interference they receive from the first AP and simultaneously schedule only that sector that causes and receives the least interference from the first AP. For instance, if the second AP knows that the first AP is transmitting to sector(1) during time interval t1, it may use that information to schedule its own users in another sector during that time. This helps the AP coordinate the sectorized operation in different restricted access windows (RAWs). In contrast, if the sector (3) in the first AP was used simultaneously with sector(2) in the second AP, it might lead to higher interference where those sectors overlap.

In an example embodiment of the invention, wireless networks may include other sensor type networks and/or other networks having a large number of supported stations/apparatuses. Examples of such networks include, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Wireless Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN.

In accordance with an example embodiment of the invention, the wireless client device 100 may be, for example, a miniature device such as a key fob, smart card, jewelry, or the like. The wireless client device 100 may be, for example, a larger device such as a cell phone, smart phone, flip-phone, PDA, graphic pad, or even larger devices such as a laptop computer, an automobile, and the like.

In an example embodiment of the invention, an apparatus comprises:

means for receiving by a wireless device, a measurement request from an associated access node, to perform measurement of at least one signal received from at least one other access node to which the wireless device is not associated, the wireless device being a member of a group of wireless devices based on reception by the wireless device of a directional beacon frame from the associated access node;

means for receiving, by the wireless device during measurement, a directional message with an access node identifier of another access node to which the wireless device is not associated and determining a reception power of the directional message;

means for transmitting, by the wireless device, to the associated access node, a measurement response comprising information on the directional message; and means for receiving, by the wireless device, from the associated access node, an indication of a time window that may be used by the wireless device for transferring data between members of the group of wireless devices and the associated access node, based at least partly on the measurement response.

In an example embodiment of the invention, an apparatus comprises:

means for transmitting, by an access node, a measurement request to an associated wireless device, to perform measurement of at least one signal received from at least one other access node to which the wireless device is not associated, the wireless device being a member of a group of wireless devices based on transmission by the access node to the wireless device, of a directional beacon frame;

means for receiving, by the access node from the wireless device, a measurement response comprising information on a directional message with an access node identifier of another access node to which the wireless device is not associated, the information including a reception power of the another directional beacon; and means for determining, by the access node, a time window that may be used by wireless devices that are members of the group of wireless devices, for transferring data between members of the group of wireless devices and the access node, based at least partly on the measurement response.

In an example embodiment of the invention, a computer program product comprises computer executable program code recorded on a computer readable, non-transitory storage medium, the computer executable program code comprising:

code for receiving, by an access node, in a directional transmission sector of the access node, at least one interfering signal from at least one neighboring access node or from at least one neighboring wireless device associated with the at least one neighboring access node;

code for determining, by the access node, a different directional transmission sector of the access node, where transmissions by the access node in the different directional transmission sector will cause minimal interference to the at least one neighboring access node or the at least one neighboring wireless device associated with the at least one neighboring access node; and code for transmitting, by the access node, in the different directional transmission sector of the access node, to a group of wireless devices associated with the access node and occupying the different directional transmission sector, an indication of a time window that may be used by the wireless devices that are members of the group of wireless devices, for transferring data between members of the group of wireless devices and the access node, based at least partly on the determination by the access node.

C. Coordinated Beamforming for Mutually Interfering Multi-Antenna Networks

The mutual interference due to simultaneous operation of networks in an uncoordinated manner becomes a critical obstacle in achieving high data rates for wireless communications. Interference nullifies the potential increase in spectral efficiency promised by advanced physical-layer technologies, such as channel bonding and multiple-input multiple-output (MIMO) technology.

A relevant example is the mutual interference caused by WiFi networks deployed randomly in close proximity to each other. For a concentrated density of WiFi networks, it is impossible to find orthogonal, interference-free operating channels for each of them in either 2.4 GHz or 5 GHz, resulting in mutual interference in an overlapping basic service set (OBSS) scenario. In an example embodiment of the invention, coordinated transmission techniques mitigate interference and greatly decrease packet error rates at co-channel WiFi access points and stations.

In an example embodiment of the invention, MAC protocol and PHY-layer MIMO coordinated beamforming or precoding techniques are based on the sharing of channel state information (CSI) between co-channel WiFi APs or STAs. The entities that share CSI compute and assign precoding matrices to active STAs in a coordinated manner so as to ensure successful multipacket reception (MPR) at the APs.

In an example embodiment of the invention, a new MAC scheme is provided for OBSS, where the network allocation vector (NAV) is overruled by an adjacent AP in order to initiate the CBF process.

In an example embodiment of the invention, a new PHY-layer MIMO CBF transmission technique is provided for successful MPR, that is applicable for arbitrary antenna array sizes and OFDM parameters. The proposed MIMO principle is applicable to both single-carrier and multi-carrier air interfaces.

In an example embodiment of the invention, the method provides for two MIMO-OFDM based WiFi BSSs operating on the same channel and causes asynchronous interference to each other. In other words, their transmitted packets have a partial overlap in time. The BSSs may have near-simultaneous transmissions by design to maximize spectral efficiency (for e.g., through contention-free PCF/HCCA scheduling by the APs), or in an overlapping BSS (OBSS) scenario. The moderate to high interference scenario is discussed, where uncoordinated co-channel transmissions almost always result in packet decoding failure.

The WiFi STAs and WiFi APs may be equipped with NS and NA antennas respectively, and employ OFDM modulation. The APs may be capable of multipacket reception, which implies that a packet collision at the receivers does not necessarily lead to packet loss. Under MPR, the APs may decode and cancel interfering packets as long as the SINR is above some threshold, to yield a cleaner signal for the desired packet.

Figure 5:
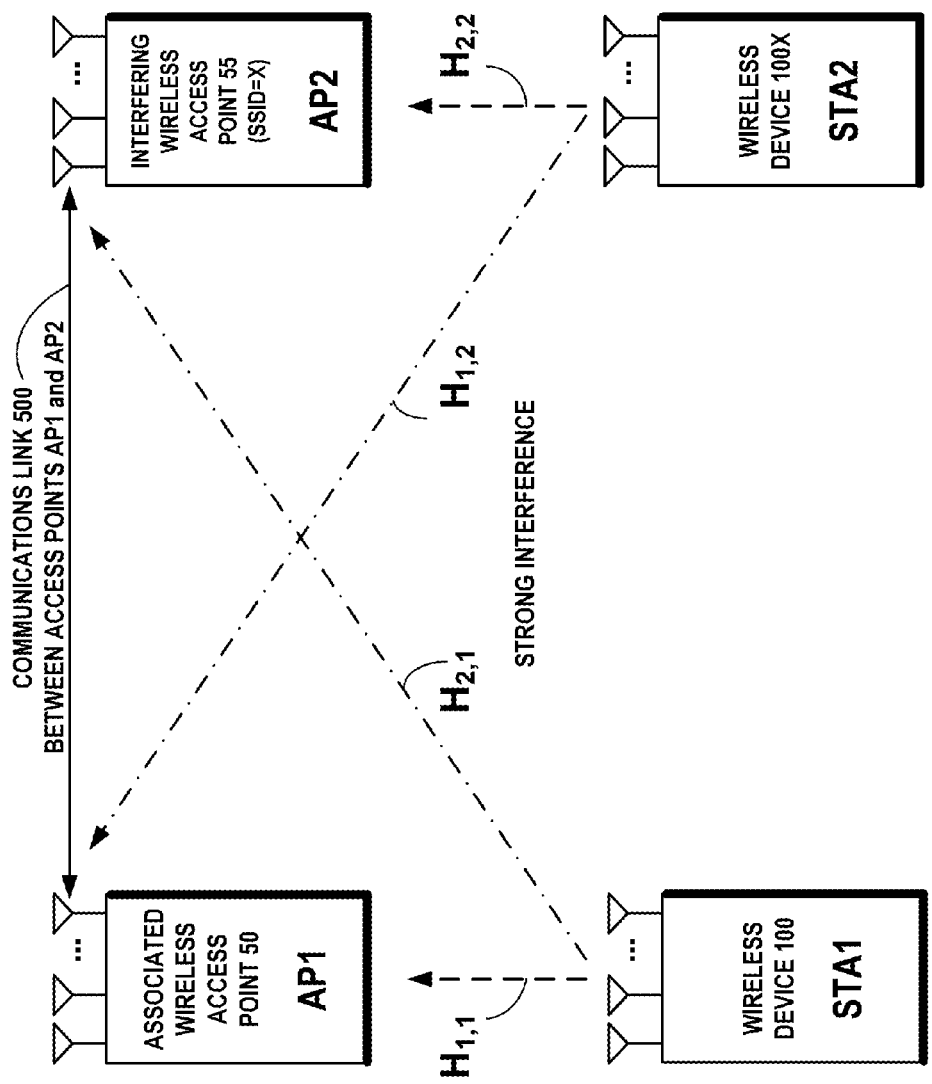
FIG. 5 illustrates an example embodiment of the invention, showing mutually interfering WiFi BSSs with multiple transmit and receive antennas, in accordance with at least one embodiment of the present invention.

When the adjacent WiFi networks operate near-simultaneously, the transmitter(s) from one network may cause unintentional interference to the receiver(s) of the other network, and vice versa. An example is shown in FIG. 5, with one active WiFi client in each BSS. FIG. 5 shows the associated access point device 50 as AP1 and its associated wireless device 100 as STA1 in a first BSS. The figure shows the interfering access point device 55 as AP2 and its associated wireless device 100X as STA2 in a second BSS. The communications link 500 between access points AP1 and AP2 may be the Internet or other suitable communications link to exchange information between the two access points.

System Model:

Without loss of generality the CBF process is described for an arbitrary OFDM subcarrier and therefore suppress the subcarrier index for convenience. The ($N_A \times 1$) received signals at the two APs is written as $$y_1 = H_{1,1}x_1 + H_{1,2}x_2 e^{-j\frac{2\pi m_2 \tau_2}{T}} + n_1 \qquad (1)$$
$$y_2 = H_{2,2}x_2 + H_{2,1}x_1 e^{-j\frac{2\pi m_1 \tau_1}{T}} + n_2$$

where $H_{i,j} \in \mathbb{C}^{N_A \times N_S}$ are the complex channel matrices from STA j to AP i, $x_1$ and $x_2$ are the transmitted STA signals with possibly random time offsets $\tau_1$ and $\tau_2$ with respect to the non-intended APs, the WiFi OFDM symbol duration is T, and $n_i$ is colored zero-mean complex additive white Gaussian noise with covariance matrix $Z_i$, i=1,2. The STA transmit signals $x_1$ and $x_2$ are designed based on MIMO precoding techniques with transmit covariance matrices $E\{x_i x_i^H\}=Q_i$ and average transmit power constraints $Tr(Q_i) \le P_i$. This can be transformed into a linear matrix precoding structure by setting $x_i=T_i s_i$, where $s_i$ is the STA data vector with $E\{s_i s_i^H\}=I$, and precoding matrix $T_i$ is obtained from the eigenvalue decomposition of $Q_i=U_i D_i U_i^H$, as $T_i=U_i D_i^{1/2}$.

At the APs, the received signal is first post-processed with a decoding matrix $W_i \in \mathbb{C}^{N_S \times N_A}$, followed by decoding operations on the resulting signal $W_i y_i$. It is assumed that the APs employ zero-forcing receivers that are functions of the direct channels only for simplicity, represented by $W_i = (H_{i,i}^H H_{i,i})^{-1} H_{i,i}^H$.

This embodiment focuses on the optimal coordinated design of STA signal covariance matrices $Q_i$ (equivalently, STA precoding matrices $T_i$) so that both APs can successfully perform MPR to cancel out interference and subsequently decode their respective desired packets.

CBF Initiation and CSI Acquisition:

CBF is triggered when an AP perceives a very high packet error rate and persistent re-transmissions due to interference and packet collisions from an adjacent BSS. In the OBSS mode, The proposed MIMO CBF schemes to be described later require the acquisition of global CSI ($H_{1,1}, H_{1,2}, H_{2,1}, H_{2,2}$) at the entities that computes the optimal MIMO precoders. In one scenario, this computation is done at the AP side which acquires the needed CSI based on the new OBSS MAC protocol described next (also see FIG. 7).

Figure 7:
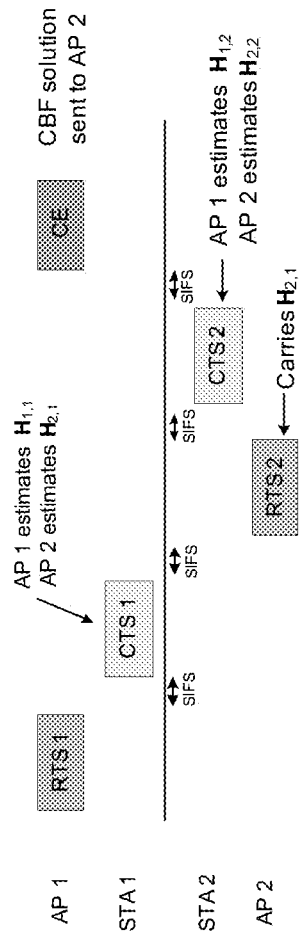
FIG. 7 illustrates an example embodiment of the invention, showing MAC and global CSI acquisition process at APs when they compute CBF solution, in accordance with at least one embodiment of the present invention.

In FIG. 7, AP 1 first transmits an RTS frame addressed to STA 1, which is also received and decoded by AP 2. The CTS response from STA 1 is used by AP 1 to estimate $H_{1,1}$, AP 2 to estimate the cross-channel $H_{2,1}$. After the CTS response from STA 1, instead of setting the MAC NAV duration to the value specified in RTS 1, AP 2 overrules its NAV and sends its own RTS addressed to STA 2. The RTS sent by AP 2 also carries its estimate of channel $H_{2,1}$ the PHY header, which is received and decoded by AP 1. The corresponding CTS from STA 2 is used by AP 2 to estimate $H_{2,2}$ and AP 1 to estimate the cross-channel $H_{1,2}$. Therefore, AP 1 now possesses global CSI of all four channel matrices and computes the MIMO CBF solution.

In an example embodiment of the invention, a new control frame, dubbed the CBF exchange (CE) frame, is used to exchange precoder information between APs to initiate the CBF process.

Figure 8:
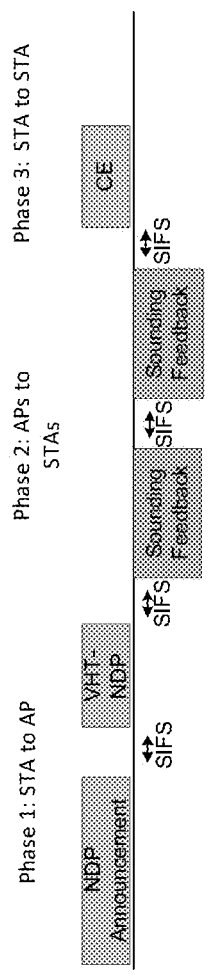
FIG. 8 illustrates an example embodiment of the invention, showing Global CSI acquisition process at STAs when they compute CBF solution, in accordance with at least one embodiment of the present invention.

In another embodiment, the precoder computation is done by the STAs who first acquire the global CSI. This is technically more challenging due to the requirement of neighbor discovery between STAs associated with different BSSs. Assuming successful neighbor discovery, a possible CSI acquisition process is described next (see FIG. 8). The STAs initiate the sequential transmission of NDP frames from the APs, allowing them to estimate their own direct channels and cross-channels and subsequently exchange their CSI either using ad hoc mode or WiFi-direct. To reduce the latency of the triggered sounding process, a RIFS interval may be implemented between messages instead of SIFS.

MPR Conditions:

Multiple-packet reception (MPR) schemes use interference cancellation techniques to receive and decode multiple packets that arrive simultaneously and are known to be very efficient. In principle, even if multiple packets are received near-simultaneously (i.e., they collide), they can be decoded and cancelled out if their individual SINRs are above a minimum threshold. In a MIMO system, we define signal and interference-plus-noise powers in terms of the Frobenius norms of the corresponding terms in equation (1), and the SINR is the ratio of these Frobenius norms.

After accounting for the receiver-side ZF post-processing, the MPR conditions at AP 1 are written as $$\frac{Tr(W_1 H_{1,2} Q_2 H_{1,2}^H W_1^H)}{Tr(W_1 (H_{1,1} Q_1 H_{1,1}^H + Z_1) W_1^H)} \geq \gamma_1 \text{ (step 1)}; \quad (2)$$

$$\frac{Tr(W_1 H_{1,1} Q_1 H_{1,1}^H W_1^H)}{Tr(W_1 Z_1 W_1^H)} \geq \gamma_2 \text{ (step 2)}$$

with SINR thresholds $\gamma_1$ and $\gamma_2$ needed for successful packet decoding. Note that the interfering packet is decoded first, since we are focusing on the strong interference regime. In other embodiments, the decoding order may be dynamic.

Similarly, the MPR conditions at AP 2 can be written as $$\frac{Tr(W_2 H_{2,1} Q_1 H_{2,1}^H W_2^H)}{Tr(W_2 (H_{2,2} Q_2 H_{2,2}^H + Z_2) W_2^H)} \geq \gamma_1 \text{ (step 1)}; \quad (3)$$

$$\frac{Tr(W_2 H_{2,2} Q_2 H_{2,2}^H W_2^H)}{Tr(W_2 Z_2 W_2^H)} \geq \gamma_2 \text{ (step 2)}$$

Proposed MIMO Coordinated Beamforming:

Joint CBF Design:

In one embodiment, the transmit covariance matrices $Q_1$ and $Q_2$ are designed jointly by an entity (one of the APs or STAs) which possesses complete CSI of the system. Without loss of generality assume the computations are done at the APs. The objective function is set as the minimization of the sum transmit power of the STAs, subject to the MPR conditions in (2) and (3) being satisfied. The pseudo-code is shown below:

```
minimize(trace(Q1+Q2))
such that
trace(Q1)<=P1;
trace(Q2)<=P2;
Q1==semidefinite(Ns);
Q2==semidefinite(Ns);
real(trace(W2*H21*Q1*H21'*W2'))>=
(real(trace(W2*H22*Q2*H22'*W2'+W2*Z2*W2')))*gamma1
; real(trace(W1*H11*Q1*H11'*W1'))>=
(real(trace(W1*Z1*W1')))*gamma2;
real(trace(W1*H12*Q2*H12'*W1'))>=
(real(trace(W1*H11*Q1*H11'*W1'+W1*Z1*W1')))*gamma1
;
real(trace(W2*H22*Q2*H22'*W2'))>=(real(trace(W2*Z2*W2')))*
gamma2;
```

This is a convex optimization problem with a unique and efficiently-computable global optimal solution since both the objective function and constraints are trace functions, which are linear functions and therefore convex. Either AP can design both matrices and inform the adjacent AP of the matrix that should be used by its associated STA.

Sequential CBF Design:

In another embodiment, AP i first designs $Q_i$ to satisfy its individual power constraint (assuming $Q_j$ is a worst-case interferer with uniform spatial power allocation), the first (step 1) MPR condition at its neighbor, and the second (step 2) MPR condition for itself. AP i then sends its choice of $Q_i$ to AP j using the CE control frame, who then computes $Q_j$ to satisfy its own individual power constraint, the first (step 1) MPR condition at its neighbor, and the second (step 2) MPR condition for itself. The APs still require global CSI in the sequential CBF case.

Figure 6:
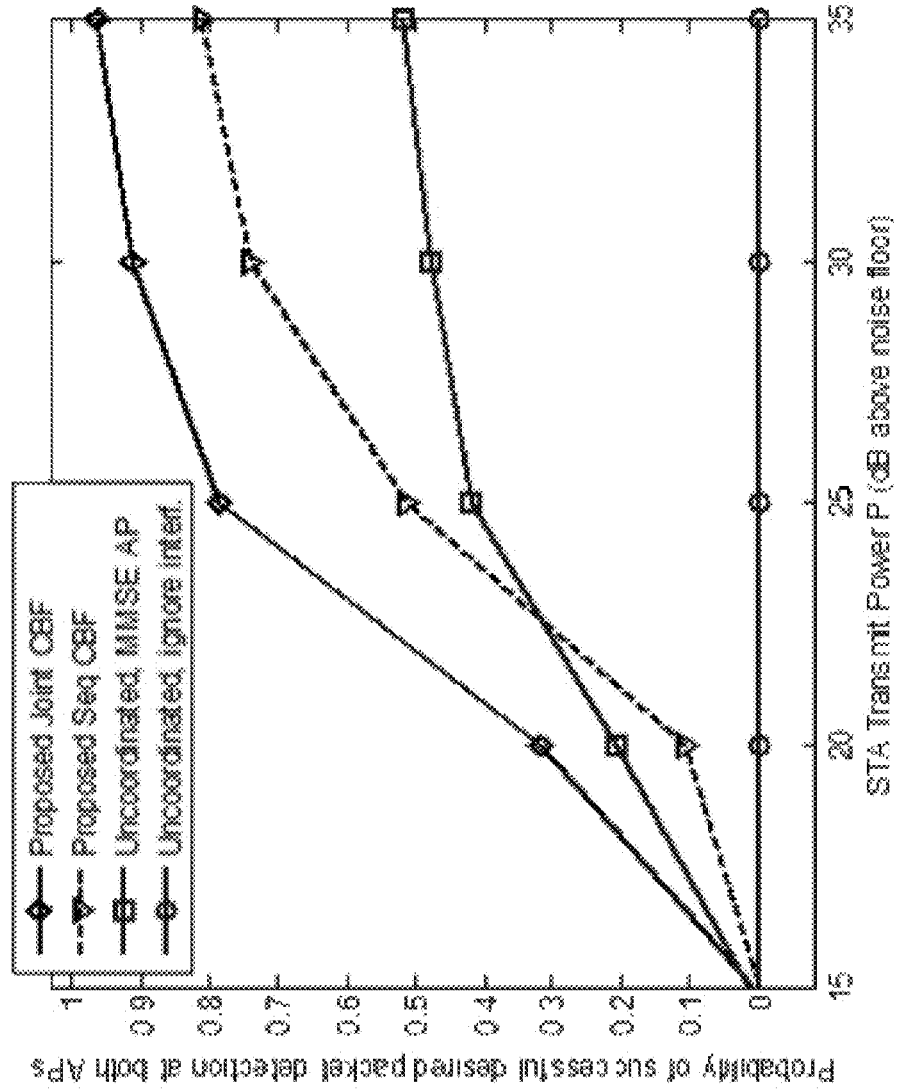
FIG. 6 illustrates an example embodiment of the invention, showing probability that both APs successfully decode their desired packets, in accordance with at least one embodiment of the present invention.

FIG. 6 depicts the probability that both AP 1 and AP 2 successfully decode their respective packets from STA 1 and STA 2 under Rayleigh fading assuming a single carrier, after performing MPR under the proposed joint and sequential CBF schemes with ZF receivers. Both APs and STAs have 2 antennas each, example SINR thresholds are $\gamma_1 = \gamma_2 = 2.5$ dB, and the noise covariance matrices are set to identity matrices. As a baseline comparison, two uncoordinated schemes are shown where each STA designs its transmit covariance matrix individually to meet a SINR threshold for its own packet without knowledge of the CSI of the adjacent network, and APs do not perform MPR (directly decode their desired packet in step 1). In the uncoordinated case which ignores interference, each AP utilizes a ZF receiver. In the second uncoordinated scenario, each AP utilizes an optimal MMSE receiver. The proposed CBF schemes provide a very high probability of successful packet detection even in the strong interference regime (95% and 80% for joint and sequential algorithms), and significantly outperform the uncoordinated methods which either fail completely or provide 50% packet detection rate at best.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments of the invention have been disclosed, a person skilled in the art will understand that changes can be made to the specific example embodiments without departing from the spirit and scope of the invention.

What is claimed is:

1. A method, comprising:
communicating, by a wireless device, with an associated access node, in a first time window allocated to a group of wireless devices associated with the associated access node in a sector, the wireless device being a member of the group of wireless devices, based on reception by the wireless device of a directional beacon frame from the associated access node in the sector;
receiving by the wireless device, a measurement request from the associated access node, to perform measurement of at least one signal received in the sector from at least one other access node to which the wireless device is not associated;
receiving, by the wireless device during measurement in response to the measurement request, a directional message in the sector, with an access node identifier of another access node to which the wireless device is not associated and determining a reception power of the directional message;
transmitting, by the wireless device, to the associated access node, in response to the measurement request, a measurement response comprising information on the directional message in the sector; and
receiving, by the wireless device, from the associated access node, an indication of a second time window that may be used by the wireless device for transferring data between members of the group of wireless devices in the sector and the associated access node, based at least partly on the information in the measurement response, the second time window providing channel protection in the sector for directional transmission in one or more directions, to avoid or reduce effects of interference by directional messages in the sector.

2. The method of claim 1, further comprising:
receiving, by the wireless device, a directional beacon frame directed to the sector that includes members of the group of wireless devices associated with the associated access node; and
transmitting, by the wireless device, an association request and receiving an association response from the associated access node, indicating that the wireless device has been allocated to the group of wireless devices associated with the associated access node.

3. An apparatus, comprising:
at least one processor;
at least one memory including computer program code;
the at least one memory and the computer program code configured to, with the at least one processor, cause the apparatus at least to:
communicate with an associated access node, in a first time window allocated to a group of wireless devices associated with the associated access node in a sector, the apparatus being a member of the group of wireless devices, based on reception by the apparatus of a directional beacon frame from the associated access node in the sector;
receive a measurement request from the associated access node, to perform measurement of at least one signal received in the sector from at least one other access node to which the apparatus is not associated;
receive during measurement in response to the measurement request, a directional message in the sector, with an access node identifier of another access node to which the apparatus is not associated and determining a reception power of the directional message;
transmit to the associated access node, in response to the measurement request, a measurement response comprising information on the directional message in the sector; and
receive from the associated access node, an indication of a second time window that may be used by the apparatus for transferring data between members of the group of wireless devices in the sector and the associated access node, based at least partly on the information in the measurement response, the second time window providing channel protection in the sector for directional transmission in one or more directions, to avoid or reduce effects of interference by directional messages in the sector.

4. The apparatus of claim 3, further comprising:
the at least one memory and the computer program code configured to, with the at least one processor, cause the apparatus at least to:
receive a directional beacon frame directed to the sector that includes members of the group of wireless devices associated with the associated access node; and
transmit an association request and receive an association response from the associated access node, indicating that the apparatus has been allocated to the group of wireless devices associated with the associated access node.

5. A computer program product comprising computer executable program code recorded on a computer readable, non-transitory storage medium, the computer executable program code comprising:
code for communicating, by a wireless device, with an associated access node, in a first time window allocated to a group of wireless devices associated with the associated access node in a sector, the wireless device being a member of the group of wireless devices, based on reception by the wireless device of a directional beacon frame from the associated access node in the sector;
code for receiving by the wireless device, a measurement request from the associated access node, to perform measurement of at least one signal received in the sector from at least one other access node to which the wireless device is not associated;
code for receiving, by the wireless device during measurement in response to the measurement request, a directional message in the sector, with an access node identifier of another access node to which the wireless device is not associated and determining a reception power of the directional message;
code for transmitting, by the wireless device, to the associated access node, in response to the measurement request, a measurement response comprising information on the directional message in the sector; and
code for receiving, by the wireless device, from the associated access node, an indication of a second time window that may be used by the wireless device for transferring data between members of the group of wireless devices in the sector and the associated access node, based at least partly on the information in the measurement response, the second time window providing channel protection in the sector for directional transmission in one or more directions, to avoid or reduce effects of interference by directional messages in the sector.

6. A method, comprising:
communicating, by an access node, with an associated wireless device, in a first time window allocated to a group of wireless devices associated with the associated access node in a sector, the wireless device being a member of the group of wireless devices, based on reception by the wireless device of a directional beacon frame from the associated access node in the sector;

transmitting, by the access node, a measurement request to the associated wireless device, to perform measurement of at least one signal received in the sector from at least one other access node to which the wireless device is not associated;

receiving, by the access node from the wireless device, in response to the measurement request, a measurement response comprising information on a directional message with an access node identifier of another access node to which the wireless device is not associated, the information including a reception power of the another directional beacon in the sector; and determining, by the access node, a second time window that may be used by wireless devices that are members of the group of wireless devices, for transferring data between members of the group of wireless devices in the sector and the access node, based at least partly on the information in the measurement response, the second time window providing channel protection in the sector for directional transmission in one or more directions, to avoid or reduce effects of interference by directional messages in the sector.

7. The method of claim 6, further comprising:
transmitting, by the access node, to the associated wireless device, an indication of a time window that may be used by wireless devices that are members of the group of wireless devices, for transferring data between members of the group of wireless devices and the access node, based at least partly on the measurement response.

8. The method of claim 6, further comprising:
transmitting, by the access node, to the associated wireless device, a directional beacon frame directed to a sector containing members of the group of wireless devices associated with the access node;
receiving, by the access node, an association request from the associated wireless device within certain time period;
adding, by the access node, the associated wireless device to the group corresponding to the sector; and
transmitting, by the access node, an association response, to the associated wireless device, indicating the group to which the associated wireless device has been allocated.

9. The method of claim 6, further comprising:
transmitting, by the access node, an omnidirectional beacon frame indicating a capability of subsequent directional transmissions; and
indicating, by the access node, in the omnidirectional beacon frame, a time duration for omnidirectional and one or more subsequent directional transmissions, for channel protection.

10. A method, comprising:
transmitting, by an access node, a measurement request to an associated wireless device, to perform measurement of at least one signal received from at least one other access node to which the wireless device is not associated, the wireless device being a member of a group of wireless devices based on transmission by the access node to the wireless device, of a directional beacon frame;
receiving, by the access node from the wireless device, a measurement response comprising information on a directional message with an access node identifier of another access node to which the wireless device is not associated;

determining, by the access node, a time window that may be used by wireless devices that are members of the group of wireless devices, for transferring data between members of the group of wireless devices and the access node, based at least partly on the measurement response;

receiving, by the access node, an omnidirectional beacon from another access node and setting channel protection intervals for a channel, based on the received beacon; and monitoring, by the access node, the channel during directional transmission periods and overwriting the set channel protection for a subset of directional transmission in one or more directions, where received interference is below a received threshold and for a duration less than or equal to previously set channel protection intervals.

11. An apparatus, comprising:
at least one processor;
at least one memory including computer program code;
the at least one memory and the computer program code configured to, with the at least one processor, cause the apparatus at least to:
communicate with an associated wireless device, in a first time window allocated to a group of wireless devices associated with the apparatus in a sector, the wireless device being a member of the group of wireless devices, based on reception by the wireless device of a directional beacon frame from the apparatus in the sector;
transmit a measurement request to the associated wireless device, to perform measurement of at least one signal received in the sector from at least one other access node to which the wireless device is not associated;
receive from the wireless device, in response to the measurement request, a measurement response comprising information on a directional message with an access node identifier of another access node to which the wireless device is not associated, the information including a reception power of the another directional beacon in the sector; and
determine a second time window that may be used by wireless devices that are members of the group of wireless devices, for transferring data between members of the group of wireless devices in the sector and the apparatus, based at least partly on the information in the measurement response, the second time window providing channel protection in the sector for directional transmission in one or more directions, to avoid or reduce effects of interference by directional messages in the sector.

12. The apparatus of claim 11, further comprising:
the at least one memory and the computer program code configured to, with the at least one processor, cause the apparatus at least to:
transmit to the associated wireless device, an indication of a time window that may be used by wireless devices that are members of the group of wireless devices, for transferring data between members of the group of wireless devices and the apparatus, based at least partly on the measurement response.

13. The apparatus of claim 11, further comprising:
the at least one memory and the computer program code configured to, with the at least one processor, cause the apparatus at least to:

transmit to the associated wireless device, a directional beacon frame directed to a sector containing members of the group of wireless devices associated with the apparatus;

receive an association request from the associated wireless device within certain time period;

add the associated wireless device to the group corresponding to the sector; and transmit an association response, to the associated wireless device, indicating the group to which the associated wireless device has been allocated.

14. The apparatus of claim 11, further comprising:

the at least one memory and the computer program code configured to, with the at least one processor, cause the apparatus at least to:

transmit an omnidirectional beacon frame indicating a capability of subsequent directional transmissions; and indicate in the omnidirectional beacon frame, a time duration for omnidirectional and one or more subsequent directional transmissions, for channel protection.

15. An apparatus, comprising:

at least one processor;

at least one memory including computer program code;

the at least one memory and the computer program code configured to, with the at least one processor, cause the apparatus at least to:

communicate with an associated wireless device, in a first time window allocated to a group of wireless devices associated with the apparatus in a sector, the wireless device being a member of the group of wireless devices, based on reception by the wireless device of a directional beacon frame from the apparatus in the sector;

transmit a measurement request to the associated wireless device, to perform measurement of at least one signal received in the sector from at least one other access node to which the wireless device is not associated;

receive from the wireless device, in response to the measurement request, a measurement response comprising information on a directional message with an access node identifier of another access node to which the wireless device is not associated;

determine a second time window that may be used by wireless devices that are members of the group of wireless devices, for transferring data between members of the group of wireless devices in the sector and the apparatus, based at least partly on the information in the measurement response, the second time window providing channel protection in the sector for directional transmission in one or more directions, to avoid or reduce effects of interference by directional messages in the sector;

receive an omnidirectional beacon from another access node and set channel protection intervals for a channel, based on the received beacon; and monitor the channel during directional transmission periods and overwrite the set channel protection for a subset of directional transmission in one or more directions, where received interference is below a received threshold and for a duration less than or equal to previously set channel protection intervals.

16. A computer program product comprising computer executable program code recorded on a computer readable, non-transitory storage medium, the computer executable program code comprising:

code for communicating, by an access node, with an associated wireless device, in a first time window allocated to a group of wireless devices associated with the associated access node in a sector, the wireless device being a member of the group of wireless devices, based on reception by the wireless device of a directional beacon frame from the associated access node in the sector;

code for transmitting, by the access node, a measurement request to the associated wireless device, to perform measurement of at least one signal received in the sector from at least one other access node to which the wireless device is not associated;

code for receiving, by the access node from the wireless device, in response to the measurement request, a measurement response comprising information on a directional message with an access node identifier of another access node to which the wireless device is not associated, the information including a reception power of the another directional beacon in the sector; and code for determining, by the access node, a second time window that may be used by wireless devices that are members of the group of wireless devices, for transferring data between members of the group of wireless devices in the sector and the access node, based at least partly on the information in the measurement response, the second time window providing channel protection in the sector for directional transmission in one or more directions, to avoid or reduce effects of interference by directional messages in the sector.

17. The method of claim 6, further comprising:

transmitting, by the access node, to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the access point supports sectorized transmission and when excessive interference is not caused to neighboring wireless devices.

18. The method of claim 6, further comprising:

transmitting, by the access node, to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the access point supports sectorized transmission and when excessive interference is not caused to neighboring wireless devices; and transmitting, by the access node, directional data in the sector to the group of wireless devices occupying the sector.

19. The apparatus of claim 11, further comprising:

the at least one memory and the computer program code configured to, with the at least one processor, cause the apparatus at least to:

transmit to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the apparatus supports sectorized transmission and when excessive interference is not caused to neighboring wireless devices.

20. The apparatus of claim 11, further comprising:

the at least one memory and the computer program code configured to, with the at least one processor, cause the apparatus at least to:

transmit to the associated wireless device, a clear to send message that includes a sector identification, to enable the group of wireless devices occupying a sector so identified, to ignore any Request to Send (RTS) and/or Clear to Send (CTS) signals transmitted by a neighboring access point, when the apparatus supports sectorized transmission and when excessive interference is not caused to neighboring wireless devices; and transmit directional data in the sector to the group of wireless devices occupying the sector.

\* \* \* \* \*